United States Patent [19]
Freerksen et al.

[11] Patent Number: 6,035,424
[45] Date of Patent: *Mar. 7, 2000

[54] METHOD AND APPARATUS FOR TRACKING PROCESSING OF A COMMAND

[75] Inventors: Donald Lee Freerksen; Peder James Paulson, both of Rochester, Minn.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/761,379

[22] Filed: Dec. 9, 1996

[51] Int. Cl.$^7$ .................................................. G06F 13/00
[52] U.S. Cl. ............................... 714/40; 714/47; 714/48; 714/16
[58] Field of Search .................. 395/183.16, 183.18, 395/184.01, 185.01, 185.02, 183.21, 383, 390, 392, 670, 676, 677, 678, 182.13, 182.14; 714/40, 42, 15, 16, 47, 48

[56] References Cited

U.S. PATENT DOCUMENTS

| | | | |
|---|---|---|---|
| 4,156,906 | 5/1979 | Ryan | 364/200 |
| 4,217,640 | 8/1980 | Porter et al. | 364/200 |
| 4,245,303 | 1/1981 | Durvasula et al. | 364/200 |
| 4,313,158 | 1/1982 | Porter et al. | 364/200 |
| 5,023,776 | 6/1991 | Gregor | 364/200 |
| 5,121,488 | 6/1992 | Ngai | 395/392 |
| 5,233,702 | 8/1993 | Emma et al. | 395/425 |
| 5,357,617 | 10/1994 | Davis et al. | 395/375 |

(List continued on next page.)

OTHER PUBLICATIONS

Israel, Paul et al, 1995 Electronic Engineering Times (Jun. 19), pp. 78–80, "Chip Set Aims to Speed Secondary Cache—Parallelism Enhances Level 2 Cache Runs".

Jouppi, Norman P., 17th Annual International Symposium on Computer Architecture (May 28–31, 1990), pp. 364–373, "Improving Direct–Mapped Cache Performance by the Addition of a Small Fully–Associative Cache and Prefetch Buffers".

Stiliadis, Dimitrios et al, IEEE Proceedings of the 27th Annual Hawaii International Conference on System Sciences (1994), pp. 412–421, "Selective Victim Caching: A Method to Improve the Performance of Direct–Mapped Caches".

Stilliadis, Dimitrios et al, IEEE Transactions on Computers, vol. 46, No. 5 (May 1997), pp. 603–610, "Selective Victim Caching: A Method to Improve the Performance of Direct–Mapped Caches".

U.S. Patent application Serial No. 08/761,378, filed Dec. 9, 1996, entitled "Multi–Entry Fully Associative Transition Cache" by Donald L. Freerksen et al.

(List continued on next page.)

*Primary Examiner*—Norman Michael Wright
*Attorney, Agent, or Firm*—Birch, Stewart, Kolasch & Birch; Karina Ojanen

[57] ABSTRACT

An apparatus for tracking processing of commands between command sources and sinks includes a command directory. The command directory receives a command from at least one command source, receives signals from command sinks, generates status information corresponding to the command based on the command and the received signals, and stores the status information. The status information indicates to which command sink the command is to be routed, whether the command sink has accepted the command, and whether the command sink has completed processing the command. The command directory includes a command buffer having a plurality of directory entries. The command buffer stores a command and associated status information in a directory entry. The command buffer also includes free buffer logic which monitors the status information in each directory entry. Based on this monitoring, the free buffer logic determines whether a directory entry has been disabled or whether command tracking errors exist.

25 Claims, 12 Drawing Sheets

U.S. PATENT DOCUMENTS

| | | | |
|---|---|---|---|
| 5,375,223 | 12/1994 | Meyers et al. | 395/425 |
| 5,392,397 | 2/1995 | Elko et al. | 395/200 |
| 5,421,014 | 5/1995 | Bucher | 395/650 |
| 5,423,016 | 6/1995 | Tsuchiya et al. | 395/425 |
| 5,524,260 | 6/1996 | Matsuda | 395/392 |
| 5,530,864 | 6/1996 | Matheny et al. | 395/700 |
| 5,539,895 | 7/1996 | Bishop et al. | 395/465 |
| 5,592,634 | 1/1997 | Circello et al. | 395/586 |
| 5,604,912 | 2/1997 | Iadonato et al. | 395/800 |
| 5,608,720 | 3/1997 | Biegel et al. | 370/249 |
| 5,625,837 | 4/1997 | Popescu et al. | 395/392 |
| 5,630,075 | 5/1997 | Joshi et al. | 395/250 |
| 5,644,742 | 7/1997 | Shen et al. | 395/183.14 |
| 5,644,752 | 7/1997 | Cohen et al. | 395/449 |
| 5,652,859 | 7/1997 | Mulla | 395/473 |
| 5,657,480 | 8/1997 | Jacobson | 395/555 |
| 5,680,573 | 10/1997 | Rubin et al. | 395/456 |
| 5,696,936 | 12/1997 | Church et al. | 395/465 |
| 5,701,503 | 12/1997 | Singh et al. | 395/800 |
| 5,727,203 | 3/1998 | Hapner et al. | 395/614 |

OTHER PUBLICATIONS

U.S. Patent application, Serial No. 08/761,380, filed Dec. 9, 1996, entitled "Method and Apparatus for Prioritizing and Routing Commands from a Command Source to a a Command Sink" by Donald L. Freerksen et al.

Microprocessor Report vol. 11, No. 9, Jul. 14, 1997, P. Song, "multithreading comes of age", pp. 13–18, and also IAC Accession No. 19613947.

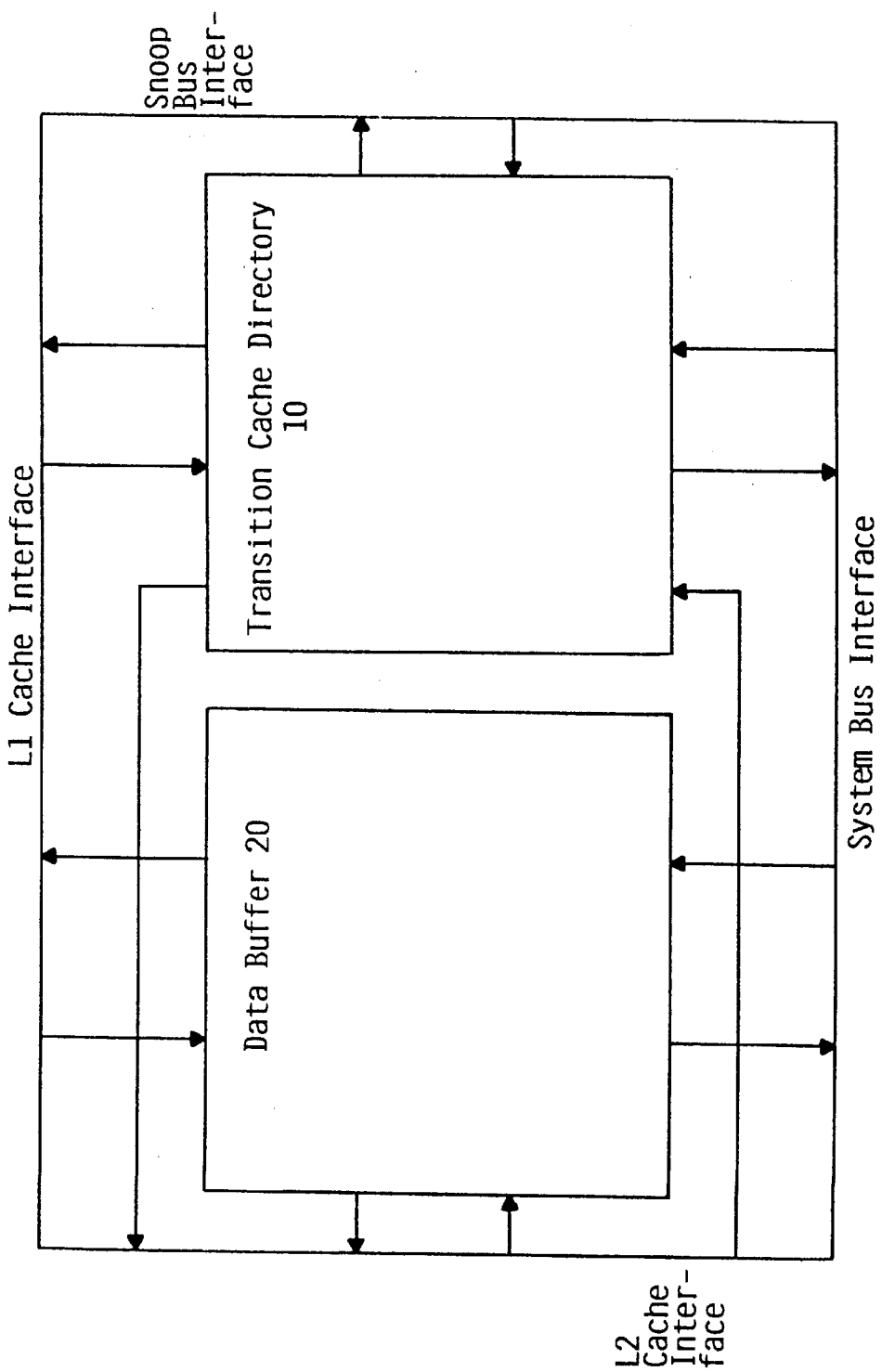

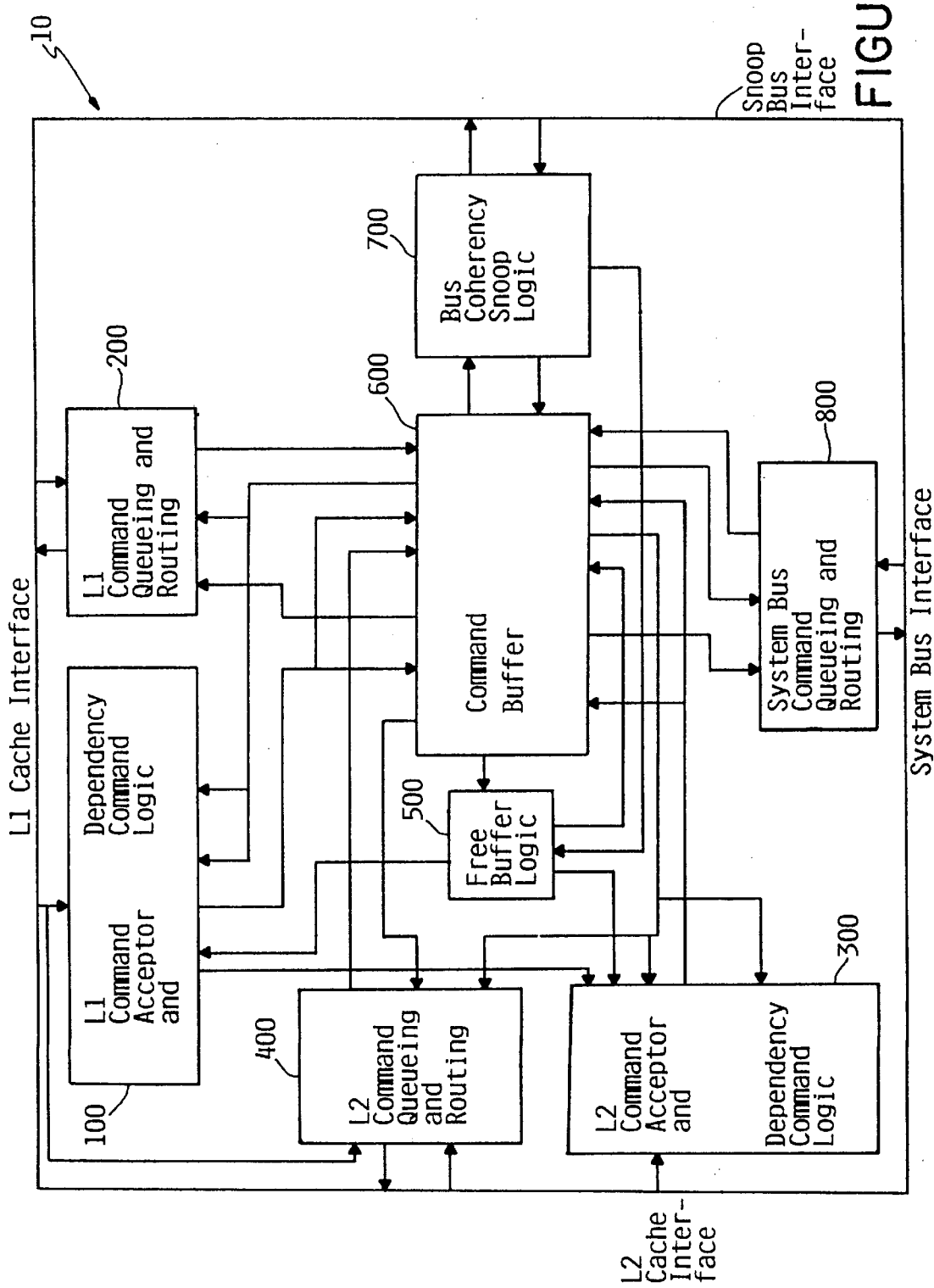

| MESI | COMMAND TYPE | IN USE | TRACKING | ADDRESS | DEPEND. |
|---|---|---|---|---|---|

FIGURE 6A

| IN USE | ROUTE TO | CMD TAKEN | DONE | Dependency | |
|---|---|---|---|---|---|
| | | | | Dep1 | Dep2...Dep7 |

FIGURE 6B

| L1 1 | L2 TAG1 | L2 DATA1 | SB | L1 2 | L2 TAG2 | L2 TAG2 |

FIGURE 6C

|  | In Use | Route To LLLSLLL 12DB12D | Cmd Tkn LLLSLLL 12DB12D | Done LLLSLLL 12DB12D |
|---|---|---|---|---|
| 1) | 0 | 0000000 | XXXXXXX | XXXXXXX |
| 2) | 1 | 0110000 | 1000000 | 1000000 |
| 3) | 1 | 0110000 | 1110000 | 1000000 |
| 4) | 1 | 0010100 | 1110100 | 1100000 |
| 5) | 1 | 0000100 | 1110100 | 1110000 |
| 6) | 1 | 0000000 | 1110100 | 1110100 |
| 7) | 0 | 0000000 | 1110100 | 1110100 |
|  |  |  |  |  |
| 8) |  | repeat | steps 1-3 |  |
| 9) | 1 | 0001000 | 1110000 | 1110000 |
| 10) | 1 | 0001100 | 1111100 | 1110000 |
| 11) | 1 | 0000110 | 1111100 | 1111000 |
| 12) | 1 | 0000010 | 1111100 | 1111100 |
| 13) | 1 | 0000010 | 1111110 | 1111100 |
| 14) | 1 | 0000001 | 1111110 | 1111110 |
| 15) | 1 | 0000001 | 1111111 | 1111110 |
| 16) | 1 | 0000000 | 1111111 | 1111111 |
| 17) | 0 | 0000000 | 1111111 | 1111111 |
|  |  |  |  |  |
| 18) |  | repeat | steps 1-3 | and 9-13 |
| 19) | 1 | 0000000 | 1111110 | 1111110 |
| 20) | 0 | 0000000 | 1111110 | 1111110 |

FIGURE 8

METHOD AND APPARATUS FOR TRACKING PROCESSING OF A COMMAND

RELATED APPLICATION DATA

The present invention relates to the following U.S. Applications: (1) U.S. application Ser. No. 08/761,378, entitled MULTI-ENTRY FULLY ASSOCIATIVE TRANSITION CACHE, filed concurrently herewith by Donald L. FREERKSEN, Farnaz MOUNES-TOUSSI, Peder J. PAULSON, John D. IRISH, and Lyle E. GROSBACH; and (2) U.S. application Ser. No. 08/761,380 entitled METHOD AND APPARATUS FOR PRIORITIZING AND ROUTING COMMANDS FROM A COMMAND SOURCE TO A COMMAND SINK, filed concurrently herewith by Donald L. FREERKSEN and Peder J. PAULSON.

BACKGROUND OF THE INVENTION

1. Field of the Invention

The present invention relates to an apparatus and method for tracking processing of a command.

2. Description of Related Art

Conventionally, in a data processing system, commands and associated data are transferred from caches and processors to other caches and processors using buffers. For instance, in one possible architecture two cache line buffers are connected to a level one cache, L1 cache, and a level two cache, L2 cache. These two line buffers are also connected to a main memory, a host processor, and possibly other processors via a system bus. When a command issues from one of the L1 cache, L2 cache or system bus, the L1 cache, L2 cache or system bus issuing the command is referred to as the command source. The one of the L1 cache, the L2 cache and the system bus to which the command is to be routed is referred to as the command sink. A cache line buffer allows for the smooth transition of data between components having different data transfer rates.

A conventional cache line buffer strictly handles either fill commands or cast back commands, and includes a memory space which can store a finite, for example, four, lines of cache pertaining to such commands. Each line of cache in a cache line buffer is, therefore, strictly designated as either a fill cache line or a cast back cache line.

When, for example, a request for data from the host processor to the L1 cache results in a miss, the L1 cache issues a fetch command to the L2 cache via a fill cache line buffer. The fetch command requests that the L2 cache provide the L1 cache with the missing cache line. In other words, the L1 cache is requesting to fill a cache line.

The L1 cache, however, may not have any space available to store the cache line requested. In this case, the L1 cache casts out a line of cache to make room for the expected new line of cache. This process is referred to as a cast back. If the cache line being cast back was modified while in the L1 cache, the cache line is sent via a cast back cache line buffer and the system bus to main memory to update the copy of this cache line in main memory; otherwise, the cache line is discarded. Typically, as discussed above, the conventional data processing system includes a fill cache line buffer and a cast back cache line buffer. Accordingly, the four lines of cache on the fill cache line buffer are designated as fill cache lines and the four lines of cache in the cast back cache line buffer are designated as cast back cache lines.

This strict cache line structure, however, poses problems. The fill cache line buffer can only handle at most four fetch commands at one time. The cast back cache line buffer cannot be used to handle a fifth fetch command, and as such, a fifth fetch command will have to await the availability of one of the fill cache lines. The same is true with respect to a fifth cast back command.

The conventional cache line buffer also includes a plurality of unidirectional queues for each command path. For instance, a fetch command from the L1 cache directed towards the L2 cache is placed in an L1-to-L2 queue, assuming a fill cache line is available. The fetch command will then be processed in due course based on the type of queue, e.g. FIFO, LIFO, etc. Similarly, unidirectional queues exist from each command source to each command sink. Consequently, besides the unidirectional L1-to-L2 queue the cache line buffer includes a unidirectional L2-to-L1 queue. Some cache line buffers, however, implement shared queues. For instance, some conventional cache line buffers use a shared queue for the command path from the system bus to the L1 cache and the command path from the system bus to the L2 cache.

The simple command queuing system of conventional cache line buffers posses problems. The use of a simple unidirectional queue from a command source to a command sink does not permit the processing of commands by priority, or easily permit dynamically changing the priority in which commands are processed. Furthermore, the processing of commands is not centrally tracked, and the cache line buffer provides no means of establishing ownership over the cache line residing therein. Such additional failings increase the difficulty and complexity of using data processing systems having conventional cache line buffers in multiprocessor systems. In multiprocessor systems, cache line ownership, established by associating a memory image coherency state, is important to the overall operation of the multiprocessor system. One example method is MESI, where MESI stands for modified, exclusive, shared and invalid.

SUMMARY OF THE INVENTION

It is an object of the present invention to provide an apparatus and method for handling commands and data associated therewith which overcomes the drawbacks of conventional cache line buffers discussed above.

Another object of the present invention is to provide an apparatus and method for handling commands and data associated therewith which freely allocates memory space for storage of cache lines.

It is a further object of the present invention to provide an apparatus and method for handling commands and data associated therewith which processes commands according to a priority therefor.

It is a still further object of the present invention to provide an apparatus and method for handling commands and data associated therewith wherein the priority in which commands are processed is dynamically changeable.

An additional object of the present invention is to provide an apparatus and method for handling commands and data associated therewith which tracks the processing of commands.

Still another object of the present invention is to provide an apparatus for handling commands and data associated therewith which determines errors in the tracking of command processing.

It is a yet another object of the present invention is to provide an apparatus and method for handling commands and data associated therewith which obtains ownership of cache lines residing therein.

These and other objectives are achieved by providing an apparatus for handling commands and data associated therewith which includes a data buffer and a command directory. The command directory receives and stores a command from at least one command source, and allocates an unused portion of the data buffer to the command. The data buffer stores the data associated with the command in the allocated portion of the data buffer.

The objectives of the present invention are also achieved by providing an apparatus for handling commands and data associated therewith which includes a command directory and a data buffer. The command directory includes a command buffer which receives and stores a command from at least one command source. The command buffer also stores status information corresponding to the command indicating, at least, a command sink to which to route the command. The data buffer stores data associated with the command. The command directory further includes routing logic, corresponding to each command sink. Each routing logic identifies which commands stored in the command buffer to route to the corresponding command sink based on the status information, and routes the identified commands to the command sink.

The objectives of the present invention are further achieved by providing each routing logic such that each routing logic determines a priority of the identified commands and routes the identified commands in order of priority.

The objectives are still further achieved by providing an apparatus for tracking processing of commands which includes a status buffer. The status buffer stores status information for each command output by a command source. The status information indicates to which command sink the command is to be routed, whether the command sink has taken the command, and whether the command sink has completed processing the command. The status information is generated by the command directory, which includes the status buffer, based on the command and signals received from the command sinks.

Furthermore, the command directory includes a command buffer having a plurality of directory entries. The command buffer stores a command and associated status information in a directory entry. The command buffer also includes free buffer logic which monitors the status information in each directory entry. Based on this monitoring, the free buffer logic determines whether a directory entry has been disabled or whether command tracking errors exist.

These and other objectives are also achieved by providing a method for handling commands and data associated therewith. The method includes the steps of receiving a command from at least one command source, and storing the command in a command directory. The method further includes the steps of allocating an unused portion of a data buffer to the command, and storing data associated with the command in the allocated portion of the data buffer.

Furthermore, the objectives of the present invention are achieved by providing a method of handling commands and data associated therewith which includes the steps of receiving a command from at least one command source, generating status information based the command, and storing the command and the status information associated therewith in a command buffer. The status information indicates, at least, a command sink to which to route the command. The method also includes the step of storing data associated with the command in a command buffer. The method further includes the steps of identifying, for each command sink, which commands stored in the command buffer to route to the command sink based on the status information, and routing the identified commands to the command sink.

The objectives of the present invention are further achieved by determining a priority of the identified commands and routing the identified commands in order of priority.

The objectives of the present invention are still further achieved by providing a method for tracking processing of commands which includes the steps of receiving a command from a command source, generating initial status information based on the command, and storing, in a command buffer, the status information for each command output by a command source. The status information indicates to which command sink the command is to be routed, whether the command sink has taken the command, and whether the command sink has completed processing the command.

Furthermore, the command directory includes a command buffer having a plurality of directory entries. The command buffer stores a command and associated status information in a directory entry. The command buffer also includes free buffer logic which monitors the status information in each directory entry.

The method further includes the step of monitoring the status information of each directory, and determining, based on the monitoring, whether a directory entry has been disabled or whether command tracking errors exist.

Other objects, features, and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 illustrates a high level diagram of the transition cache according to the present invention;

FIG. 2 illustrates a high level diagram of the transition cache directory illustrated in FIG. 1;

FIG. 6A illustrates one directory entry in the command buffer;

FIG. 6B illustrates the in use and tracking information in a directory entry;

FIG. 6C illustrates the route to, command taken, and done bits;

FIG. 8 illustrates the status of the route to, command taken, and done bits during the processing of a fetch command issued by the L1 cache.

DETAILED DESCRIPTION OF THE PREFERRED EMBODIMENTS

FIG. 1 illustrates a high level diagram of the transition cache according to the present invention. As shown in FIG. 1, the transition cache includes a transition cache directory 10 and a data buffer 20. The data buffer 20 is connected to an L1 cache via an L1 cache interface, to an L2 cache via an L2 cache interface and to system bus via a system bus interface. An interface, such as the L1 cache interface, is the control logic and/or controller for, for example, the L1 cache.

The transition cache directory 10 is likewise connected to the L1 cache via the L1 cache interface, the L2 cache via the L2 cache interface and system bus via the system bus interface. The transition cache directory 10 is also connected to a snoop bus via a snoop bus interface. Hereinafter, the L1 cache and the L1 cache interface, the L2 cache via an L2 cache interface, the system bus and the system bus interface, and the snoop bus and the snoop bus interface will be referred to jointly as the L1 cache, L2 cache, system bus, and snoop bus, respectively, for ease of description. It should be understood, however, that signals input and output by the transition cache are done so via the interfaces. It should also be understood that the various paths illustrated in FIG. 1, and FIGS. 2–7 discussed below, have been represented in greatly simplified form for clarity. In reality, many separate data paths into and out of the various components are required. Furthermore, for the sake of clarity, many of the data and control lines have been eliminated entirely from the figures.

Data Buffer

Figure 7:
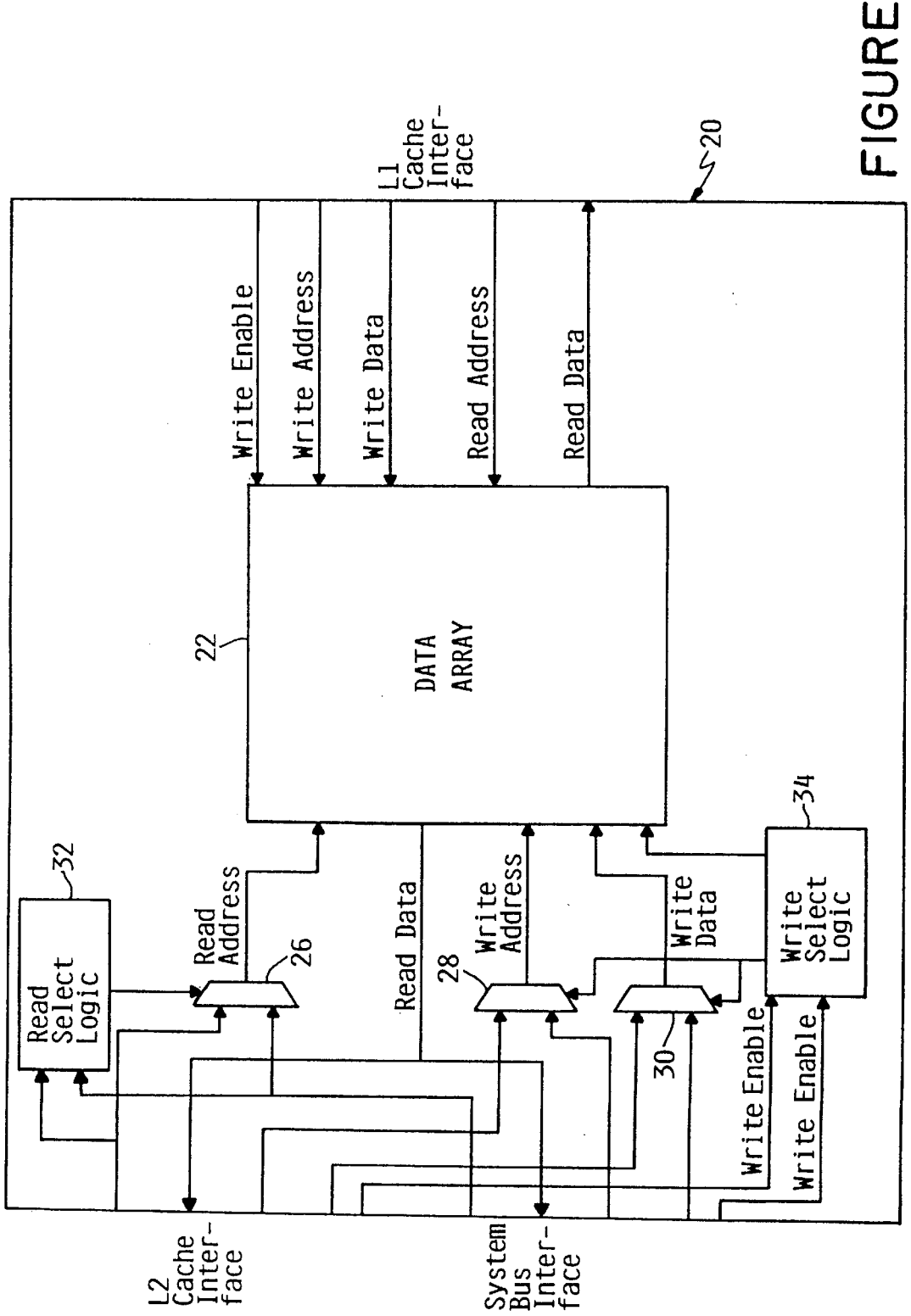
FIG. 7 illustrates the data buffer of FIG. 1.

FIG. 7 illustrates the data buffer 20 in greater detail. As shown in FIG. 7, the data buffer 20 includes a four port data array 22 with two read ports and two write ports. The data buffer 20 also includes multiplexers 26, 28 and 30, read select logic 32, and write select logic 34. The data array 22 receives the inputs of write enable signal, write address, write data, and read address from the L1 cache. The multiplexer 26 and the read select logic 32 receive the read addresses output from the L2 cache and the system bus. The multiplexer 26 outputs one of the read addresses to the data array 22 based on the read selection signal output by the read select logic 32.

The write select logic 34 receives the write enable signals from the L2 cache and the system bus, and outputs a write selection signal to the multiplexers 28 and 30. The multiplexer 28 receives the write addresses output from the L2 cache and the system bus, and outputs one of the write addresses to the data array 22 based on the write selection signal. The multiplexer 30 receives write data from both the L2 cache and the system bus, and outputs the write data from one of the L2 cache and the system bus to the data array 22. The data array 22 also outputs read data to both the L2 cache and the system bus, and separately outputs read data to the L1 cache.

Data Buffer Operation

The operation of the data buffer 20 will now be described. As shown in FIG. 7, the data array 22 is a four port data array, but must process data from and output data to three sources. Accordingly, the multiplexers 26, 28, and 30 serve to make the data array 22 appear as a six port data array. The data array 22 receives a write enable signal from the L1 cache. When the data array 22 receives the write enable signal, the data array 22 stores the write data from the L1 cache in the address specified by the write address from the L1 cache. When the data array 22 receives a read address from the L1 cache, the data array 22 outputs the data stored in the address specified by the read address to the L1 cache.

The read addresses supplied to the data buffer 20 by the L2 cache and the system bus are received by read select logic 32. If only one of the L2 cache and system bus currently outputs a read address, the read select logic 32 supplies a selection signal to multiplexer 26 such that the multiplexer 26 outputs the read address from the one of L2 cache and the system bus currently supplying the real address. If, however, both the L2 cache and system bus concurrently supply a read address, the read select logic 32 causes the multiplexer 26 to output the read address supplied by the system bus to the data array 22. The data array 22 then outputs the data addressed by the read address to the L2 cache and system bus.

As shown in FIG. 7, the write select logic 34 receives the write enable signal from the L2 cache and system bus indicating that the L2 cache and system bus want to write data to the data array 22. If only one of the write enable signals indicates a desire to write to the data array 22, the write select logic controls the multiplexers 28 and 30 such that the one of the L2 cache and system bus desiring to write to the data array 22 has the write address and write data output therefrom sent to the data array 22. If, however, the L2 cache and system bus attempt to write to the data array 22 concurrently, the write select logic 34 controls the multiplexers 28 and 32 to select and output the write address and write data from the L2 cache to the data array 22. When data is to be written to the data array 22 from the L2 cache and system bus, the write select logic 34 also supplies a write enable signal to the data array 22. Upon receipt of the write enable signal, the data array 22 writes the data received from the multiplexer 30 in the address specified by the write address received from the multiplexer 28.

Transition Cache Directory

FIG. 2 illustrates a high level diagram of the transition cache directory 10 illustrated in FIG. 1. As shown in FIG. 1, the transition cache directory 10 interfaces with the L1 cache, the L2 cache, the system bus and the snoop bus. The transition cache directory 10 includes an L1 command acceptor and dependency command logic 100, hereinafter "L1 command acceptor logic 100," and an L1 command queuing and routing logic 200, hereinafter "L1 routing logic 200," interfacing with the L1 cache. Both the L1 command acceptor logic 100 and the L1 routing logic 200 are connected to a command buffer 600.

As shown in FIG. 2, the transition cache directory 10 further includes an L2 command acceptor and dependency command logic 300, hereinafter "L2 command acceptor logic 300," and an L2 command queuing and routing logic 400, hereinafter "L2 routing logic 400," interfacing with the L2 cache. Both the L2 command acceptor logic 300 and the L2 routing logic 400 are connected to the command buffer 600. The L2 command acceptor logic 300 is also connected to the L1 command acceptor logic 100. The L2 routing logic 400 is also connected to the L1 cache. Furthermore, system bus command queuing and routing logic 800, hereinafter "system bus routing logic 800," interfaces with the system bus, and is connected to the command buffer 600.

The transition cache directory 10 also includes free buffer logic 500 and bus coherency snoop logic 700. The free buffer logic 500 is connected to the L1 command acceptor logic 100, the L2 command acceptor logic 300, the bus coherency logic 700, and the command buffer 600. The bus coherency snoop logic 700 interfaces with the snoop bus, and is further connected to the command buffer 600.

Command Buffer

The command buffer 600 includes a plurality of directory entries. In a preferred embodiment, the command buffer 600 includes eight directory entries; but, the number of directory entries is not limited to eight. Instead, depending on desired operating characteristics, the number of directory entries can be increased or decreased. The number of directory entries, however, corresponds to the number of cache lines the data buffer 20 can store. A one-to-one correspondence exists between the directory entries in the command buffer 600 and the cache lines in the data buffer 20. Additionally, this one-to-one correspondence extends to the directory entry and cache line addresses. For instance, directory entries 0, 1, 2, etc. in the command buffer 600 correspond to cache lines 0, 1, 2, etc. in the data buffer 20. Consequently, increasing or decreasing the number of directory entries requires a like increase or decrease in the number of cache lines in the data buffer 20. As discussed in more detail below, the directory entries record command information, and status information therefor, such that the cache lines of the data buffer 20 are freely allocatable. Consequently, unlike conventional cache line buffers, the number of fill and cast back cache lines is not preset. Therefore, the present invention does not suffer from the draw backs of conventional cache line buffers.

FIG. 6A illustrates an example of one directory entry. As shown in FIG. 6A, the directory entry includes the memory image coherency state, e.g., the MESI state, of the associated cache line stored in the data buffer 20, the op code or command type, in use information, tracking information, the real address of the associated cache line stored in the data buffer 20, and dependency information. The in use information, the tracking information, and the dependency information are collectively referred to as status information. The in use information indicates whether the directory entry is being used. The tracking information indicates the current status of processing with respect to the command stored in the directory entry, and the dependency information indicates any dependencies the command might have with respect to other commands.

FIG. 6B illustrates the status information in greater detail. As shown in FIG. 6B the status information includes an in use bit, route to bits, command taken bits, done bits, and dependency bits. When turned on, the in use bit indicates that the directory entry is in use.

The route to bits, the command taken bits, and done bits have the format shown in FIG. 6C. When turned on in the route to bits, the L1 bit indicates that the command is to be routed to the L1 cache. The next two bits L2 Tag1 and L2 Data1 relate to the L2 cache. In the embodiment of the transition cache according to the present invention, it is assumed that the L2 cache has separate pipelines for processing commands and data. Accordingly, when turned on in the route to bits, the L2 Tag1 bit indicates that the command is to be routed to the command pipeline of the L2 cache. The L2 Data bit indicates that the data associated with the command, i.e., data to be stored by the L2 cache or output from the L2 cache, is to be routed to the data pipeline of the L2 cache. When the transition cache is used with an L2 cache having a single pipeline for commands and data, a single bit can replace the L2 Tag1 bit and the L2 Data1 bit. The next bit, SB, indicates that the command is to be routed to the system bus when turned on.

Before processing is complete a command is often routed back to the command source. For instance, in response to a fetch command issued from the L1 cache to the L2 cache, a cache line is sent from the L2 cache to the L1 cache. Accordingly, a subpart of the fetch command is a store in L1 cache operation. Therefore, the command during this store phase must be routed back to the L1 cache. When turned on in the route to bits, the L12 bit indicates that the command is to be routed back to the L1 cache. Likewise, when turned on in the route to bits, the L2 Tag2 and L2 Data2 bits indicate that the command and associated data, respectively, are to be routed back to the L2 cache. As mentioned above, if the L2 cache has a single pipeline for processing commands and data then the L2 Tag2 and L2 Data2 bits can be replaced by a single bit.

When turned on in the command taken bits, the bits have the same meaning except with respect to whether the corresponding component, L1 cache, L2 cache or system bus, has taken the command or data. For instance, when turned on in the command taken bits, the L2 Tag1 bit indicates that the command has been taken for processing by the command pipeline in the L2 cache, and the L2 Data1 bit indicates that the data associated with the command has been taken for processing in the data pipeline of the L2 cache.

Similarly, when turned on in the done bits, the bits indicate whether the corresponding component has completed processing of the command or data.

As shown in FIG. 6B, each directory entry includes eight dependency bits Dep0–Dep7 as the dependency information. Each bit corresponds to one of the eight directory entries. When a dependency bit is set, the dependency bit indicates that the command depends on the command in the other directory entry to which the dependency bit corresponds. For instance, if the Dep0 bit is set in the directory entry having directory address 3, then the command in this directory entry depends on the performance of the command stored in the directory entry having directory address 0. Therefore, the command in the directory having directory address 3 must wait for the command in the directory having directory address 0 to complete processing before being further processed.

Operation of Transition Cache Directory

L1 Command Acceptor Logic

Next, the operation of the transition cache directory will be discussed with respect to FIG. 2. The L1 command acceptor logic 100 receives commands from the L1 cache. Initially, the L1 command acceptor logic 100 determines whether a directory entry is available in the command buffer 600. As discussed in more detail below, the free buffer logic 500 monitors the in use bits for each directory entry, and determines which directory entries are or are not in use. The free buffer logic 500 sends signals to both the L1 and L2 command acceptor logic 100 and 300 indicating whether a directory entry is available, i.e., unused, and also supplies the directory address for an available directory entry.

If a directory entry is available, then the L1 command acceptor logic 100 decodes the command to determine initial routing and the memory coherency image state, e.g., MESI state, of any cache line associated therewith. Simultaneously with the decoding operation, the L1 command acceptor logic 100 determines whether the command is dependent upon the performance of another command. These operations will be discussed in more detail below.

The L1 command acceptor logic 100 then stores the command and the real address of a cache line associated with the command in the directory entry of the command buffer 600 having the directory address specified by the free buffer logic 500. The L1 command acceptor logic 100 also turns on the in use bit for this directory entry, and sets the initial routing information in the tracking information.

Furthermore, the L1 command acceptor logic 100 stores the MESI state information in the directory entry of the command buffer 600. Some commands do not have any data associated therewith. These commands are processed in the same manner as commands having data associated therewith except that no MESI state information is stored in the directory entry therefor.

Additionally, the L1 command acceptor logic 100 stores the dependency information in the directory entry of the command buffer.

Figure 3A:
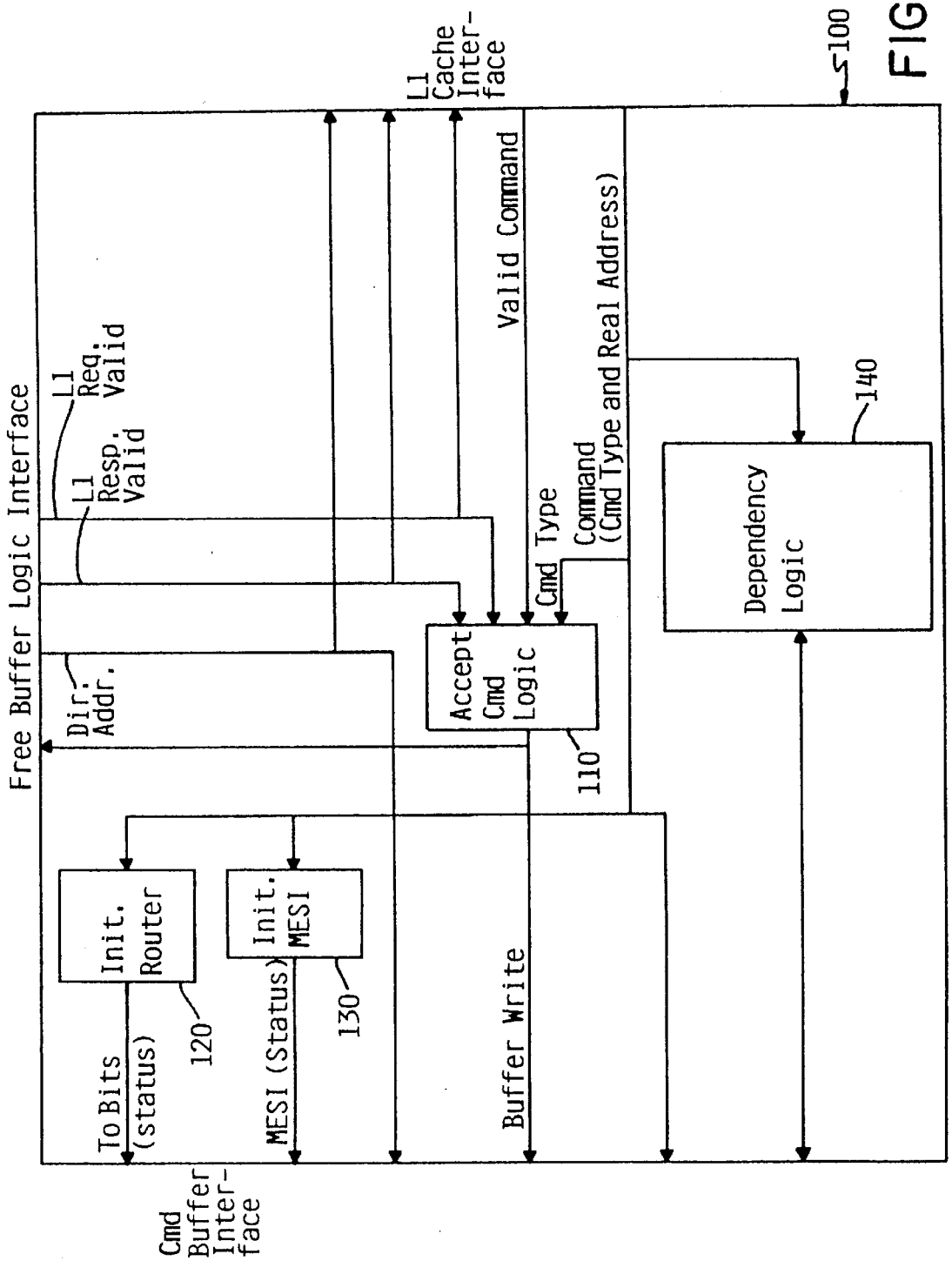
FIGS. 3A and 3B illustrate detailed diagrams of the L1 and L2 command acceptor and dependency command logic, respectively, illustrated in FIG. 2.

FIG. 3A illustrates the L1 command acceptor logic 100 in greater detail. For the sake of clarity, however, FIG. 3A does not illustrate the connections from the L1 command acceptor logic 100 to the L2 command acceptor logic 300. As shown in FIG. 3A, a command issuing from the L1 cache is sent to the command buffer 600, and is received by dependency logic 140, accept command logic 110, initial router 120, and initial MESI state determiner 130. The command includes an operation code specifying the type of command, and a real address of the cache line associated with the command. As further shown in FIG. 3A, a directory address supplied to the L1 command acceptor logic 100 by the free buffer logic 500 is supplied to the command buffer 600 and the L1 cache. If the command ends up being accepted and stored in the command buffer 600, the L1 cache uses this directory address as the read or write address for the data buffer 20.

The dependency logic 140, the accept command logic 110, the initial router 120, and the initial MESI state determiner 130 are also all connected to the command buffer 600. The output of the accept command logic 110 is also supplied to the free buffer logic 500.

The operation of the L1 command acceptor logic 100 will now be described with reference to FIG. 3A. The L1 command acceptor logic 100 can receive two categories of commands, request commands and response commands. A fetch command is an example of a request command which the L1 cache can issue. A fetch command requests a cache line from a command sink, and as a result, the L1 cache expects to receive a line of cache in response to the request. If the L1 cache does not have sufficient space to store the requested cache line, then the L1 cache makes room by issuing a cast back command. In response to an accepted cast back command, the transition cache will store a cache line output from the L1 cache to make room for the requested cache line. A cast back command is an example of a response command. Namely, the cast back command was issued in response to the fetch command.

As the discussion above demonstrates, when the L1 cache issues a request command, a response command may be issued subsequently thereto. The accept command logic 110, through the operation of the free buffer logic 500, accounts for this by making sure that the command buffer 600 can accept at least two commands when a request command has been received as discussed in detail below. The present invention, however, is not limited to requiring that two directory entries be available. Instead, a request command can be accepted when only one directory entry is available. The subsequently received response command will merely have to wait for a directory entry to become available.

As further shown in FIG. 3A, the accept command logic 110 receives two signals from the L1 cache, the command and a command valid signal. The command valid signal indicates whether the signal on the command input of the L1 command acceptor logic 100 is a valid command. The accept command logic 110 also receives two signals from the free buffer logic 500, an L1 request valid signal and an L1 response valid signal. As discussed in detail below, the free buffer logic 500 generates the L1 request valid signal and the L1 response valid signal for the L1 command acceptor logic 100.

The L1 response valid signal indicates, when valid, that enough directory entries exist to handle a response command received by the L1 command acceptor logic 100, and the L1 request valid signal indicates, when valid, that enough directory entries exist to handle a request command received by the L1 command acceptor logic 100.

When the accept command logic 110 receives a valid command from the L1 cache, the accept command logic 110 determines whether the command is a request or response type of command. If the accept command logic 110 determines that the command is a request command and the L1 request valid signal indicates validity, then the accept command logic 110 generates a buffer write signal to enable writing of the command buffer 600. If the accept command logic 110 determines that the command is a request command and the L1 request valid signal indicates invalidity, then the accept command logic 110 does not enable writing of the command buffer 600.

If the accept command logic 110 determines that the command is a response command and the L1 response valid signal indicates validity, then the accept command logic 110 generates a buffer write signal to enable writing of the command buffer 600. If the accept command logic 110 determines that the command is a response command and the L1 response valid signal indicates invalidity, then the accept command logic 110 does not enable writing of the command buffer 600.

While the accept command logic 110 determines whether the command buffer 600 is available, the initial router 120 decodes the op code of the command to determine where the command should be routed. If the initial router 120 determines that the command should be routed to the L2 cache, the initial router turns the L2 Tag1 bit in the route to bits on. The initial router 120 will also turn on the L2 Data1 bit in the route to bits if the command has a cache line associated therewith.

The initial MESI state determiner 130 decodes the command to determine whether the command is a cast back command. If the command is a cast back command, the initial MESI state determiner 130 sets a MESI state of modified; otherwise, the initial MESI state determiner 130 sets a MESI state of invalid.

During the operation of the accept command logic 110, the initial router 120, and the initial MESI state determiner 130, the dependency logic 140 determines whether the command received from the L1 cache is dependent on any other commands. Specifically, the dependency logic 140 compares the real address of the cache line associated with the command to the real addresses associated with the commands already stored in the command buffer 600.

If the dependency logic 140 determines a match between the real address associated with the command received by the L1 command acceptor logic 100 and the real address associated with a command stored in the command buffer 600, the dependency logic 140 sets the dependency bit corresponding to the directory entry storing the command having the same real address. For instance, if a real address match exists with the command stored in the directory entry having directory address 6, when the command received by the L1 command acceptor logic 100 is stored in a directory entry, the Dep6 dependency bit will be turned on by the dependency logic 140.

When the accept command logic 110 enables writing of the command buffer 600, the command consisting of the command type and real address are written into the command buffer 600. Also, the initial router 120 writes the initial routing, the initial MESI state determiner 130 writes the MESI state, and the dependency logic 140 writes the dependency bits.

L2 Command Acceptor Logic

Figure 3B:
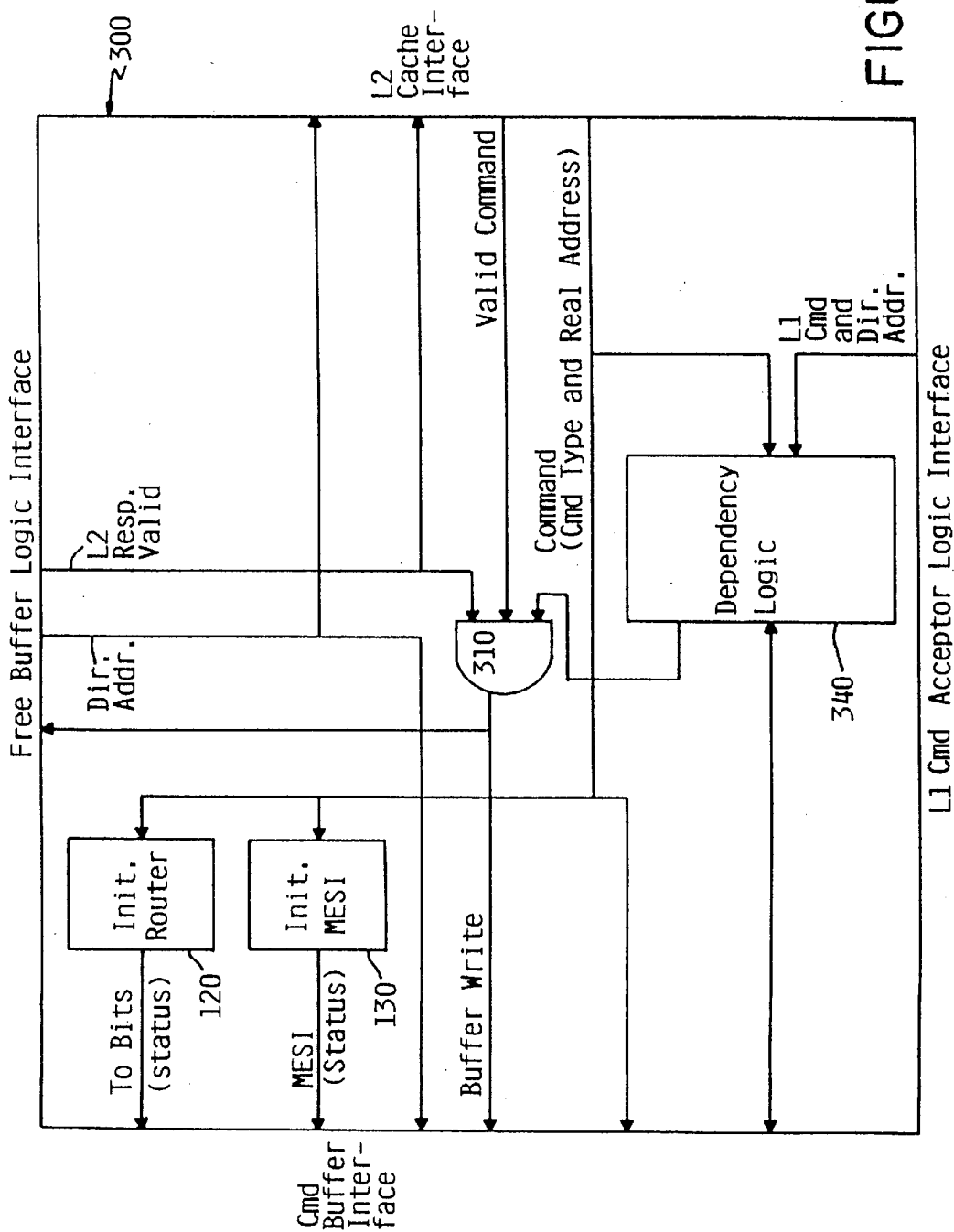

Referring to FIG. 2, the L2 command acceptor logic 300 operates in the same manner as the L1 command acceptor logic 100 except for the setting of dependency bits and determining when to enable writing of the command buffer 600. FIG. 3B illustrates the L2 command acceptor logic 300 in detail. As shown in FIG. 3B, a command issuing from the L2 cache is sent to the command buffer 600, and is received by dependency logic 340, AND gate 310, initial router 120, and initial MESI state determiner 130. As further shown in FIG. 3B, a directory address supplied to the L2 command acceptor logic 300 by the free buffer logic 500 is supplied to the command buffer 600 and the L2 cache. If the command ends up being accepted and stored in the command buffer 600, the L2 cache uses this directory address as the read or write address for the data buffer 20.

The dependency logic 340, the AND gate 310, the initial router 120, and the initial MESI state determiner 130 are also all connected to the command buffer 600. The dependency logic 340 further receives any new command and directory address therefor from the L1 command acceptor logic 100 which has not been stored in the command buffer 600. For the sake of clarity, the connections between the L1 and L2 command acceptor logic 100 and 300 have been shown in FIG. 2 but not FIG. 3A. Besides the command from the L2 cache, the AND gate 310 receives a command valid signal from the L2 cache, an L2 response valid signal from the free buffer logic 500, and a dependency signal from the dependency logic 340. The output of the AND gate 310 is supplied to the free buffer logic 500 in addition to the command buffer 600.

The operation of the L2 command acceptor logic 300 will now be described with reference to FIG. 3B. Unlike the L1 cache, the L2 cache only issues response commands. Accordingly, determining whether a command can be written to the command buffer 600 can be accomplished with the AND gate 310.

The AND gate 310 receives the command valid signal from the L2 cache, an L2 response valid signal from the free buffer logic 500, and a dependency signal from the dependency logic 340. The L2 response valid signal indicates when valid that enough directory entries exist to handle a response command received by the L2 command acceptor logic 300. The generation of the L2 response valid signal for the L2 command acceptor logic 300 is discussed in detail below with respect to the free buffer logic 500. The dependency signal indicates whether a special case dependency exists with respect to the command received from the L2 cache. If the special case dependency exists, the dependency signal is set such that the AND gate 310 does not enable writing of the command buffer 600.

Assuming the special case dependency does not exist, when the AND gate 310 receives a valid command from the L2 cache and the L2 response valid signal indicates validity, then the L2 command acceptor logic 300 generates a buffer write signal to enable writing of the command buffer 600. If the L2 response valid signal indicates invalidity or the valid command signal does not indicate validity, then the AND gate 310 does not enable writing of the command buffer 600.

While the AND gate 310 determines whether the command buffer 600 is available, the initial router 120 and the initial MESI state determiner 130 operate in the same manner as discussed above with respect to the L1 command acceptor logic 100.

The dependency logic 340 illustrated in FIG. 3B determines whether the command received from the L2 cache is dependent on any other commands. The dependency logic 340 compares the real address associated with the command received from the L2 cache with the real address of a command received from the L1 cache by the L1 command acceptor logic 100. If a match exists, the dependency logic 340 determines whether both the command issued by the L2 cache and the command issued from the L1 cache are replacement cast back commands. If so, the special case dependency exists, and the dependency logic 340 generates the dependency signal to prohibit the AND gate 310 from enabling writing of the command buffer 600.

Replacement or aging cast back commands are one type of cast back command. Replacement cast back commands are issued when a cache line for storage in a cache maps to the same cache address as a cache line currently stored. This can happen in data processing systems having associativity wherein cache lines having different real addresses map to the same cache address. When the above situation occurs, the cache issues a replacement cast back command to send the currently stored cache line back to the main memory so that the new cache line can be stored.

Because the L1 cache stores the most current data, if both the L1 cache and L2 cache issue a replacement cast back command, there is no need to have the replacement cast back command from the L2 cache processed. Therefore, when this special case exists, the dependency logic 340 prohibits processing the replacement cast back command from the L2 cache.

If a match exists between the real addresses of the command from the L2 cache and the L1 command acceptor logic 100, but the special case dependency does not exist, the dependency logic 340 sets the dependency bit corresponding to the directory address of the directory entry in which the L1 command acceptor logic 100 is going to store the command from the L1 cache.

As with the dependency logic 140 illustrated in FIG. 3A, the dependency logic 340 of FIG. 3B also compares the real address associated with the command issued from the L2 cache the real addresses associated with the commands already stored in the command buffer 600.

If the dependency logic 340 determines a real address match between the command from the L2 cache and a command stored in the command buffer 600, the dependency logic 340 decodes the command received by the L2 cache to determine if the command is a replacement cast back command. If the command from the L2 cache is not a replacement cast back command, then the dependency logic 340 sets the dependency bit corresponding to the directory entry in the command buffer 600 storing the command having the same real address as the command received from the L2 cache. Furthermore, the dependency logic 340 outputs a dependency signal allowing the AND gate 310 to enable writing of the command buffer 600.

If, however, the command received from the L2 cache is a replacement cast back command, then the dependency logic 340 inputs and decodes the command in the command buffer 600 having the matching real address. If the command from the command buffer 600 is a replacement cast back command, then the dependency logic 340 also determines from the command taken bits whether or not this command originated from the L1 cache. If the command did not originate from the L1 cache, then the dependency logic sets the dependency bit corresponding to the directory entry of the command buffer 600 storing the command having the same real address. The dependency logic 340 also outputs a dependency signal allowing the AND gate 310 to enable writing of the command buffer 600.

If the replacement cast back command stored in the command buffer 600 did originate from the L1 cache, then the dependency logic 340 determines whether or not the controller for the L2 cache has taken this command. Namely, the dependency logic 340 determines whether or not the L2 Tag1 bit is turned on. If this bit is on, then the dependency logic 340 sets the dependency bit corresponding to the directory entry in the command buffer 600 storing the command having the same real address. The dependency logic 340 also outputs a dependency signal allowing the AND gate 310 to enable writing of the command buffer 600. If the L2 Tag1 bit is off, however, then the dependency logic 340 generates a dependency signal such that the AND gate 310 does not enable writing of the command buffer 600.

When the AND gate 310 enables writing of the command buffer, the command consisting of the command type and real address are written into the command buffer 600. Also, the initial router 120 writes the initial routing, the initial MESI state determiner 130 writes the MESI state, and the dependency logic 340 writes the dependency bits.

Systems Bus Routing Logic

Figure 4A:
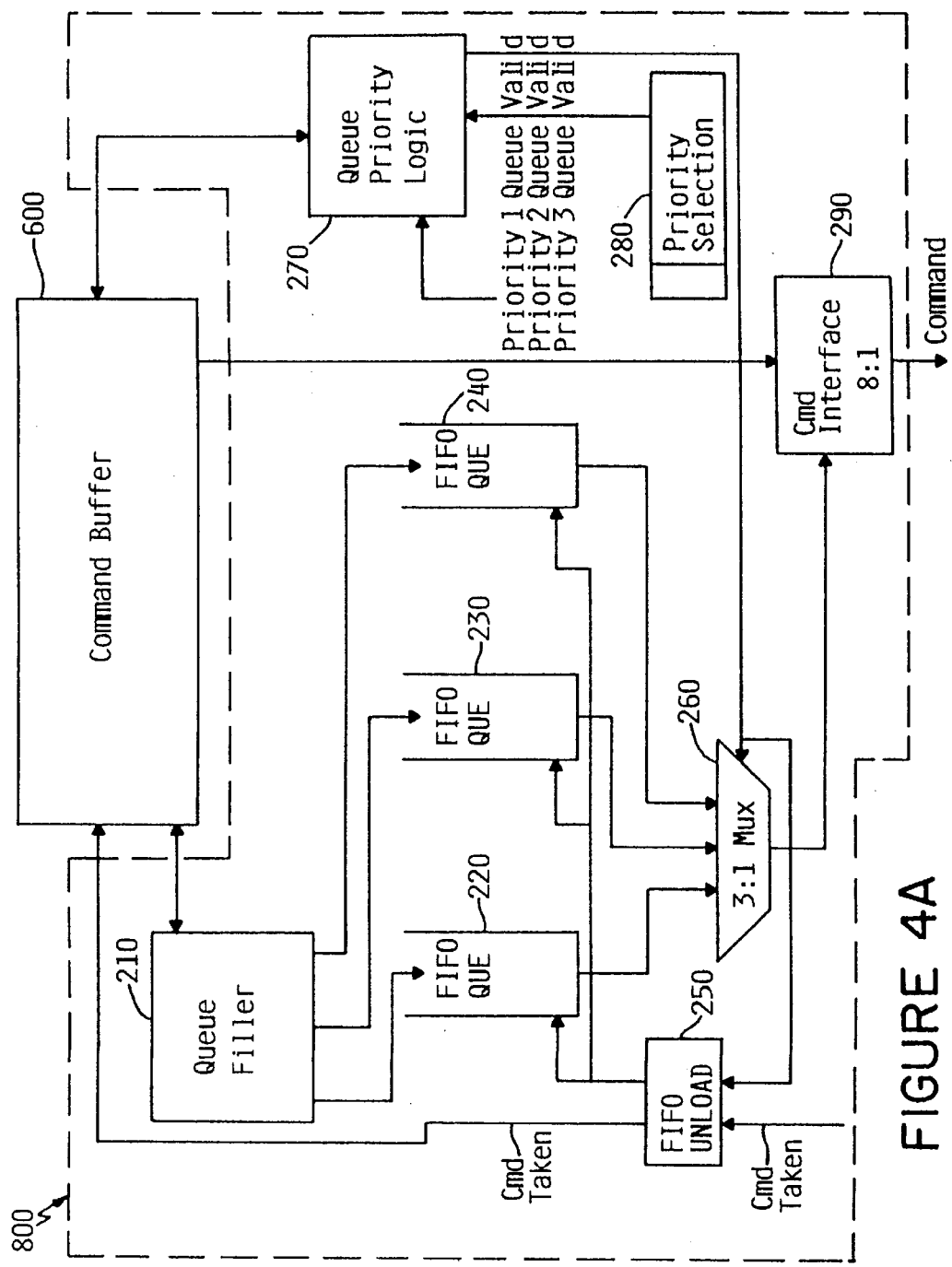
FIG. 4A illustrates a detailed diagram of the L1 and system bus command queuing and routing logic illustrated in FIG. 2.

Referring to FIG. 2, the system bus routing logic 800 identifies commands in the command buffer 600 to be routed to the system bus based on the route to and command taken bits for each directory entry, and routes the identified commands to the system bus in order of priority. FIG. 4A illustrates the system bus routing logic 800 in detail. As shown in FIG. 4A, a queue filler 210, queue priority logic 270 and a command interface 290 are connected to the command buffer 600. The queue filler 210 is further connected to queues 220, 230, and 240. In a preferred embodiment, the queues 220, 230, and 240 are first in first out, FIFO, queues. The output of the queues 220, 230, and 240 are connected to a multiplexer 260. The output of the multiplexer 260 is connected to the command interface 290.

As shown in FIG. 4A, the system bus routing logic 800 also includes a priority selection register 280 connected to the queue priority logic 270. The queue priority logic 270 also receives the validity bits of the next queue entry to be output from each of the queues 220, 230, and 240. The output of the queue priority logic 270 is received as a selection signal by the multiplexer 260, and is also received by FIFO unload logic 250. The FIFO unload logic 250 also receives the command taken output from the system bus, and supplies an unload output signal to each of the queues 220, 230, and 240. The FIFO unload 250 further supplies the command taken signal to the command buffer 600.

The operation of the system bus routing logic 800 will now be described referring to FIG. 4A. The queue filler 210 monitors the SB bit in the route to bits of each directory entry in use. If this bit is turned on but the same bit is off in the command taken bits, the queue filler 210 identifies the command corresponding to these bits as a command to be routed to the system bus. Next, the queue filler 210 checks the dependency bits for the identified command, if all of the dependency bits are turned off, then the queue filler 210 sends the directory address for the command to one of the queues 220, 230, and 240; otherwise, the queue filler 210 does not output the directory address for the command.

Based on the priority of the command, the queue filler 210 determines to which one of the queues 220, 230, 240 to output the directory address for the command. In a preferred embodiment, commands have been categorized into three command priority groups: snoop cast back commands, commands other than snoop or replacement cast back commands, hereinafter "non-cast back commands," and replacement or aging cast back commands.

As discussed in more detail below, the L1 cache and the L2 cache conventionally include bus coherency snoop logic. This snoop logic snoops, looks at, commands on the snoop bus. If the snoop logic for a cache snoops a fetch command requesting a cache line having the same real address as a cache line stored in the cache and the MESI state for that cache line is modified, the cache issues a snoop cast back command. Processing of the snoop cast back command causes the cache line to be sent to the main memory via the system bus. In this manner, the fetch command will obtain the most current data for that cache line.

In a preferred embodiment, the order of priority for the command priority groups in increasing priority is replacement cast back commands, non-cast back commands, and snoop cast back commands. The queues 240, 230, and 220 correspond to the replacement cast back, non-cast back, and snoop cast back command priority groups, respectively. It should be understood that the number and priority of the command priority groups is freely selectable, and can be increased or decreased through the addition of a corresponding queue. Additionally, the command priority groups can be changed.

Accordingly, the queue filler 210 illustrated in FIG. 4A decodes the identified command to determine its membership in a command priority group, and then outputs the identified command to the one of the queues 220, 230, and 240 corresponding to that command priority group. When the queue filler 210 outputs a directory address to one of the queues 220, 230 and 240, the queue filler 210 appends a validity bit thereto to indicate that the queue entry is a valid queue entry.

The queue priority logic 270 inputs a priority code stored in the priority selection register 280. The priority code indicates the order of priority for the queues 220, 230, and 240. In a preferred embodiment, the priority code is a two bit code. A two bit code can specify one of four possible orders of priority. If the number of queues is increased or decreased, the priority code may need to be increased or could be decreased accordingly.

In a preferred embodiment, the priority selection register 280 is programmed with a default priority code establishing the queue 220 corresponding to the snoop cast back command priority group as the highest priority queue, and the queue 230 corresponding to the non-cast back command priority group as the next highest priority queue. The queue priority logic 270 decodes the priority code to determine the order of priority of the queues 220, 230 and 240. The priority selection register 280, however, is user programmable; and therefore, by reprogramming the priority code, a user can dynamically change the priority of the queues 220, 230 and 240 and corresponding command priority groups.

The queue priority logic 270 also receives the validity bit for the highest priority queue entry in each of the queues 220, 230 and 240, i.e., the directory address a queue will output. The queue priority logic 270 then determines the highest priority queue having a valid highest priority queue entry. For instance, if the queue priority order is the queue 220, the queue 230 and the queue 240, the queue priority logic 270 checks the validity bit for the highest priority queue entry in the queue 220. If the validity bit is on, indicating validity, the queue priority logic 270 generates a selection signal such that the multiplexer 260 selects the highest priority queue entry from the queue 220.

If the validity bit is off, indicating invalidity, the queue priority logic 270 checks the validity bit for the highest priority queue entry in the queue 230. If the validity bit is on, indicating validity, the queue priority logic 270 generates a selection signal such that the multiplexer 260 selects the highest priority queue entry from the queue 230. If the validity bit is off, indicating invalidity, the queue priority logic 270 checks the validity bit for the highest priority queue entry in the queue 240. If the validity bit is on, indicating validity, the queue priority logic 270 generates a selection signal such that the multiplexer 260 selects the highest priority queue entry from the queue 240. If the validity bit is off, then not one of the queues 220, 230, and 240 is selected.

The queue priority logic 270 illustrated in FIG. 4A also receives a raise priority signal from the command buffer 600. If the raise priority signal does not indicate a raise priority condition, then the queue priority logic 270 produces a selection signal in the manner discussed above. If, however, the raise priority signal indicates a raise priority condition, then the queue priority logic 270 operates in a manner different than that discussed above. A raise priority signal is generated by the command buffer 600 when a command stored in a directory entry of the command buffer is to be processed as quickly as possible. The occurrence of this situation will be discussed in detail below with respect to the bus coherency snoop logic 700.

However, when this situation does result, the command buffer 600 generates a raise priority signal which indicates the raise priority condition, and the command to have its priority raised. The queue priority logic 270 decodes this command to determine to which of the command priority groups the command belongs. The queue priority logic 270 then generates a selection signal such that the multiplexer 260 selects the one of the queues 220, 230, and 240 corresponding to this command priority group.

The queue priority logic 270 continues to receive the raise priority signal from the command buffer 600 until the command has been completed. The command buffer 600 determines this condition when the in use bit for the directory entry storing that command has been turned off. The command buffer 600 then generates a raise priority signal indicating no raise priority condition. As a result, the queue priority logic 270 resumes controlling the multiplexer 260 in the manner discussed above with respect to the priority code stored in priority selection register 280.

The directory address selected by the multiplexer 260 is output to the command interface 290. The command interface 290 then obtains the command corresponding to this directory address from the command buffer 600, and outputs the command to the system bus. When the system bus takes the command for processing, the system bus outputs a command taken signal. The command taken signal is received by the FIFO unload logic 250, and forwarded to the command buffer 600. Besides the command taken signal, the FIFO unload logic 250 also receives the selection signal output by the queue priority logic 270. When the FIFO unload logic 250 receives the command taken signal, the FIFO unload logic 250 outputs an unload signal directing the one of the queues 220, 230, and 240 selected by the selection signal to unload or remove the highest priority queue entry therein.

L1 Routing Logic

Referring to FIG. 2, the L1 routing logic 200 identifies commands in the command buffer to be routed to the L1 cache based on the route to bits. The L1 routing logic 200 operates in a much simpler manner than either the system bus routing logic 800 or the L2 routing logic 400 because of the operation of the L1 cache.

The only commands which are routed to the L1 cache are fetch commands originally issued by the L1 cache, but which are now being rerouted to the L1 cache along with the requested data. Furthermore, to speed up the processing of each fetch command, the L1 cache maintains information regarding the fetch command such that the command itself need not be sent back to the L1 cache. Instead, the L1 cache only requires notification that data corresponding to the fetch command is being made available.

In view of the above, the L1 routing logic 200 monitors the L12 bit in the route to bits of each directory in use. If this bit is turned on, the L1 routing logic 200 identifies the command corresponding to this bit as a command to be routed to the L1 cache. cache, however, the L1 routing logic 200 outputs a signal to the L1 cache to notify the L1 cache that the data corresponding to the command is being made available.

L2 Routing Logic

Figure 4B:
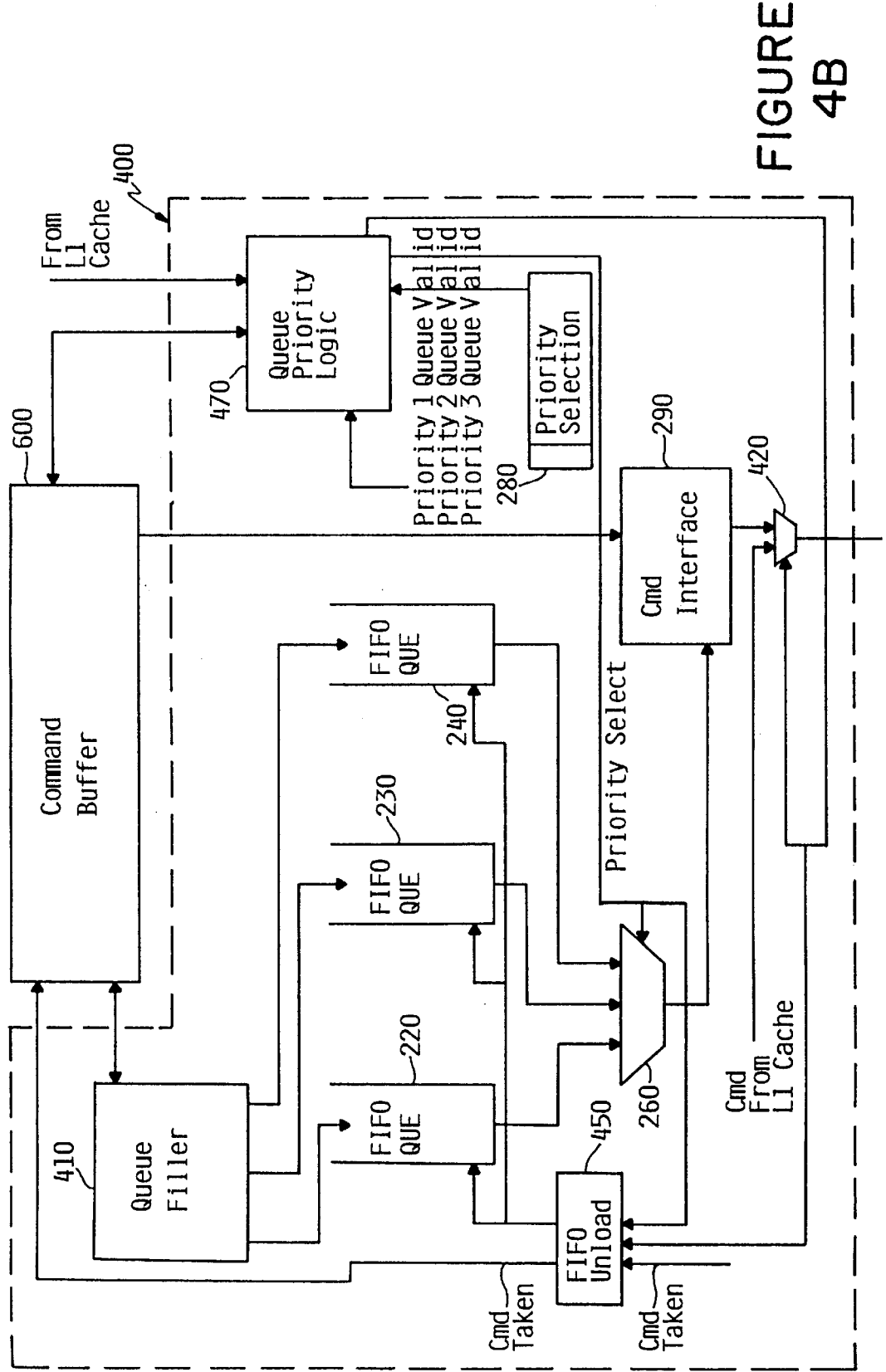
FIG. 4B illustrates a detailed diagram of the L2 command queuing and routing logic illustrated in FIG. 2.

Referring to FIG. 2, the L2 routing logic 400 identifies commands in the command buffer to be routed to the L2 cache based on the route to and command taken bits for each directory entry, and routes the identified commands to the system bus in order of priority. FIG. 4B illustrates the L2 routing logic 400 in detail. As shown in FIG. 4B, the L2 routing logic 400 is the same as the system bus routing logic 800 except that the queue filler 210 has been replaced by queue filler 410, the queue priority logic 270 has been replaced by queue priority logic 470, the FIFO unload 250 has been replaced by FIFO unload 450 and a multiplexer 420 is disposed at the output of the command interface 290. In addition to the inputs received by the queue priority logic 270, the queue priority logic 470 also receives a current command valid signal and the command issued from the L1 cache. The multiplexer 420 receives the command output by the command interface 290 and the command issued from the L1 cache for which the queue priority logic 470 received the valid signal. The multiplexer 420 outputs one of these commands based on a by-pass selection signal from the queue priority logic 470. Accordingly, only these differences between the system bus routing logic 800 and the L2 routing logic 400 will be described.

The queue filler 410 operates in the same manner as the queue filler 210 except that the queue filler 410 identifies commands in the command buffer to be routed to the L2 cache instead of the system bus.

The queue priority logic 470 operates in the same manner as the queue priority logic 270 described above with regard to FIG. 4A, but also performs the following additional operations. As shown in FIG. 4B, the queue priority logic 470 receives commands issued from the L1 cache. The queue priority logic 470 decodes the L1 cache command to determine to which of the command priority groups the L1 cache command belongs. The queue priority logic 470 then determines whether or not the command selected via the multiplexer 260 has the same or a higher priority. Namely, as discussed above with respect to the queue priority logic 270, the queue priority logic 470 determines the highest priority queue storing a valid queue entry, and thus, determines the highest priority command priority group having a command to be routed to the L2 cache. If the L1 cache command belongs to the same or a lower priority command priority group, then the queue priority logic 470 generates a by-pass selection signal which causes the multiplexer 420 to output the command output from the command interface 290.

If, however, the queue priority logic 470 determines that the L1 cache command belongs to a higher priority group than the command output from the multiplexer 260, then the queue priority logic 470 generates a by-pass selection signal which causes the multiplexer 420 to select the L1 cache command. In this manner, an L1 cache command can be routed directly to the L2 cache by-passing the normal routing pathway. This provides a considerable time savings in terms of routing.

The by-pass selection signal is also supplied to the FIFO unload 450. When the by-pass selection signal indicates that the command from the command interface 290 has been selected by the multiplexer 420, the FIFO unload 450 operates in the same manner as discussed above with respect to the FIFO unload 250. If, however, the by-pass selection signal indicates that the multiplexer 420 selected the L1 cache command, then the by-pass selection signal disables the FIFO unload 450 from unloading one of the queues 220, 230, and 240.

Free Buffer Logic

Referring to FIG. 2, the free buffer logic 500 monitors the in use bits for each directory entry, and determines which directory entries are in use and which directory entries are not in use. Based on the number of directory entries not in use, the free buffer logic 500 generates signals for the L1 and L2 command acceptor logic 100 and 300 indicating the availability of the command buffer 600. The free buffer logic 500 also generates directory addresses for the L1 and L2 command acceptor logic 100 and 300 depending on the availability of directory entries.

Figure 5:
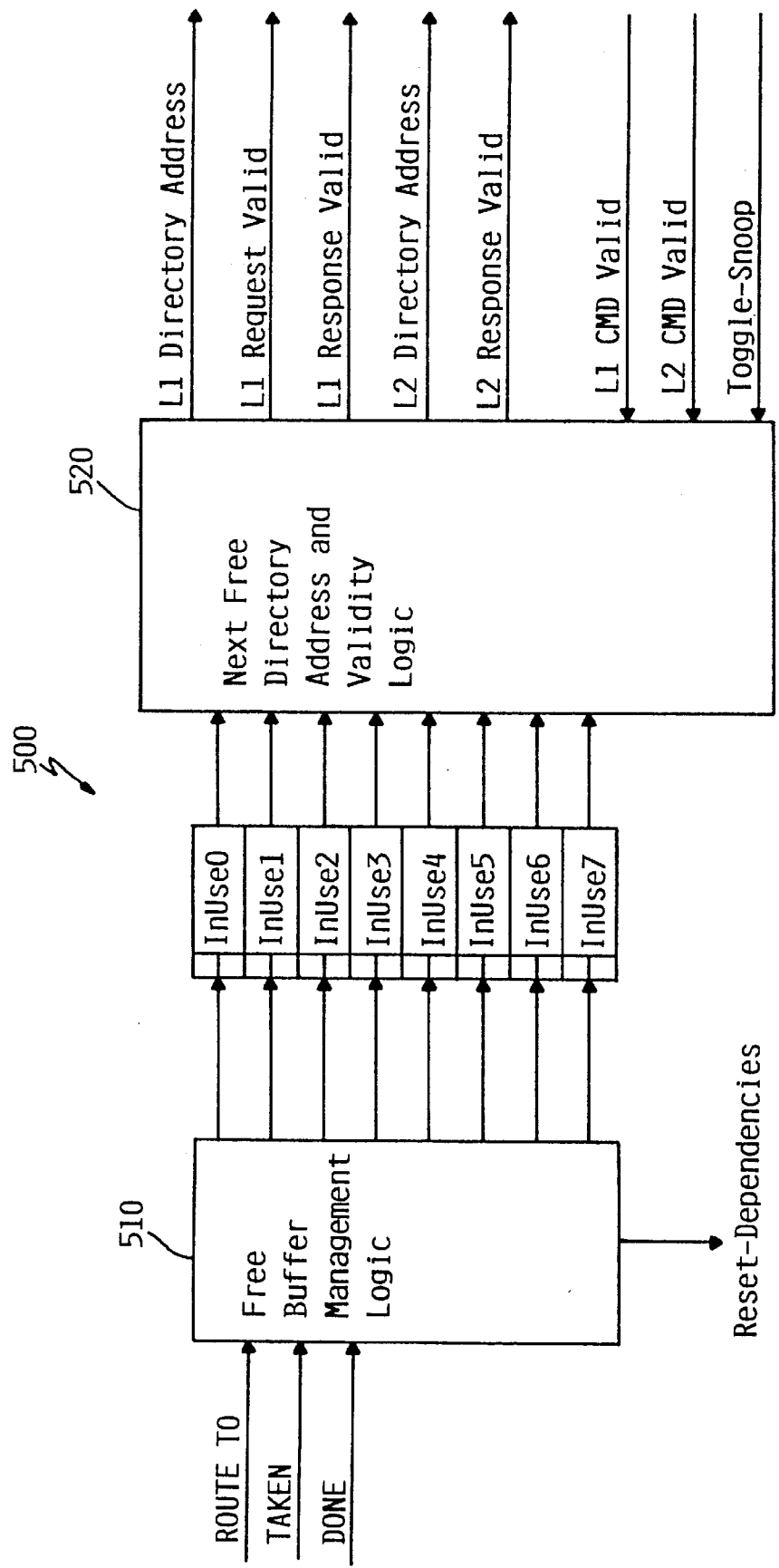
FIG. 5 illustrates a detailed diagram of the free buffer logic illustrated in FIG. 2.

FIG. 5 illustrates the free buffer logic 500 in detail. The free buffer logic 500 includes free buffer management logic 510 which monitors the route to bits, the command taken bits and the done bits, and based thereon selectively turns the in use bits and dependency bits for the directory entries off. The free buffer logic 500 further includes next free directory address and validity logic 520, hereinafter "validity logic 520," which monitors the in use bits, receives the L1 and L2 command valid signals from the L1 and L2 command acceptor logic 100 and 300, receives a toggle-snoop signal and generates the L1 request valid signal, L1 response valid signal, L1 available directory address, L2 response valid signal, and L2 available directory address based on the received signals and monitored in use bits.

The operation of the free buffer logic 500 will now be discussed in detail with respect to FIG. 5. As discussed above, the free buffer management logic 510 monitors the route to bits, the command taken bits, and the done bits. As discussed in more detail below, when the processing of a command has completed, the route to bits will all be turned off, and the status of the command taken bits will equal the status of the corresponding done bits. When the free buffer management logic 510 detects this condition for a directory entry, the free buffer management logic 510 (1) turns the in use bit for the directory entry off, and (2) turns off the dependency bit in the other directory entries corresponding this directory entry.

The validity logic 520 generates the L1 request valid signal, L1 response valid signal, and L2 response valid signal based on the number of directory entries which the validity logic 520 predicts are not in use. The validity logic 520 predicts the number of directory entries not in use by first recording the directory address for each directory entry having its in use bit turned off. The validity logic 520 then assumes that if either the L1 command acceptor logic 100 or the L2 command acceptor logic 300 was supplied with a directory address in the previous cycle, that the directory address was used. This same assumption was made in the previous cycle based on directory addresses supplied to the L1 command acceptor logic 100 and/or the L2 command acceptor logic 300 two cycles ago. Accordingly, during the present cycle, the validity logic 520 has had sufficient time to process the L1 command valid signal and the L2 command valid signal from two cycles ago to determine whether or not the directory addresses supplied to the L1 command acceptor logic 100 and the L2 command acceptor logic 300 two cycles ago were indeed used. Based on this determination, the validity logic 520 corrects the list of unused directory entries.

In the preferred embodiment, the validity logic 520 is unable to use the L1 valid signal and the L2 command valid signal one cycle ago to determine the unused directory entries because to do so would require an undesired decrease in processing speed. If such a decrease in processing speed, however, were acceptable then the L1 command valid and L2 command valid signals received one cycle ago could be used to accurately determine the directory addresses of the unused directory entries, eliminating the need for making the assumption discussed above.

Based on the corrected list of unused directory entries, the validity logic 520 counts the number of available directory entries. If three or more directory entries are available, the validity logic 520 (1) generates the L1 request valid signal and the L1 response valid signal to indicate validity, and (2) generates an L1 directory address signal identifying the lowest directory address for a directory entry in the corrected list of unused directory entries. Furthermore, if three or more directory entries are available, the validity logic 520 (1) generates the L2 response valid signal to indicate validity, and (2) generates an L2 directory address signal identifying the highest directory address for a directory entry in the corrected list of unused directory entries.

If only two directory entries are available, the validity logic 520 (1) generates the L1 response valid signal to indicate validity and the L1 request valid signal to indicate invalidity, and (2) generates an L1 directory address signal identifying the lowest directory address for a directory entry in the corrected list of unused directory entries. Furthermore, if only two directory entries are available, the validity logic 520 (1) generates the L2 response valid signal to indicate validity, and (2) generates an L2 directory address signal identifying the highest directory address for a directory entry in the corrected list of unused directory entries.

If only one directory entry is available, then the validity logic 520 checks the toggle-snoop signal, the generation of which is discussed in detail below with respect to the bus coherency snoop logic 700. If the toggle-snoop signal is off, the validity logic 520 generates the L1 response valid signal to indicate validity, and the L1 request valid signal and the L2 response valid signal to indicate invalidity. The validity logic 520 also generates the L1 directory address signal indicating the directory address of the one unused directory entry. If the toggle-snoop signal is on, the validity logic 520 generates the L2 response valid signal to indicate validity, and the L1 request valid signal and the L1 response valid signal to indicate invalidity. The validity logic 520 also generates the L2 directory address signal indicating the directory address of the one unused directory entry.

Bus Coherency Snoop Logic

Referring to FIG. 2, the bus coherency snoop logic 700 is an optional component of the transition cache directory 10. The bus coherency snoop logic 700 promotes coherency of operation between processors in a multiprocessor system. When the data processing system incorporating the transition cache according to the present invention forms a part of a multiprocessor system, preferably, the transition cache directory 10 includes the bus coherency snoop logic 700.

The bus coherency snoop logic 700 is the same as the conventional logic used in the L1 cache and L2 cache of conventional multiprocessors, but includes additional logic to generate the toggle-snoop signal and cause the command buffer 600 to issue a raise priority signal. This additional logic will be readily apparent from the description which follows.

The operation of the conventional snoop logic will now be described. As discussed above the MESI state ownership system is the conventional, well known vehicle by which multiprocessors maintain coherency with respect to data. Snooping is the process by which the processors of the multiprocessor system maintain accurate MESI states for the data. As further discussed above, a MESI state is associated with each line of cache, and when a line of cache is transferred to the data buffer 20, the associated MESI state is stored in the corresponding directory entry of the command buffer 600. In this manner, the transition cache obtains ownership of the cache line.

When processors of a multiprocessor system issue commands, these commands are placed on the snoop bus for snooping, i.e., a form of monitoring discussed in more detail below, by the other processors. For instance, the bus coherency snoop logic in the L1 cache snoops a command on the snoop bus, and checks to see if the real address associated with the command matches the real address of a cache line stored therein. If no match is found, the command is ignored. If a match is found, the L1 cache alters the MESI state for the cache line, if warranted, according to well known techniques.

For example, suppose that the L1 cache for a first processor snoops a fetch command from a second processor and a real address match results. If the MESI state for the cache line indicates exclusive, the L1 cache for the first processor will change the MESI state to shared because the fetch command indicates that the second processor will at some point store the same cache line.

As another example, assume that instead of exclusive, the MESI state for the cache line is modified. Because the MESI state is modified, the L1 cache assumes that it has the most updated version of the cache line, and outputs the cache line to main memory via the system bus so that the second processor can obtain the most updated version of this cache line.

The bus coherency snoop logic 700 illustrated in FIG. 2 operates in the same fashion. The bus coherency snoop logic 700 snoops a command on the snoop bus, and determines whether a real address match exists with respect to the commands stored in the command buffer 600. If a match does not exist, the snooped command is ignored. If a match does exist, then the MESI state stored by the command buffer 600 corresponding to the command having the real address of the snooped command is updated according to well known techniques.

Furthermore, if the snoop command was a request for data, like the fetch command in the example above, the bus coherency snoop logic 700 outputs a signal on the snoop bus that the data is unavailable, and that the source of the command should try again later. Unlike the L1 and L2 caches, the transition cache does not output data on the system bus in response to a snooped command. The reason for this is simple. The cache line resides in the transition cache because a previously issued command, now stored in the command buffer 600, required operation thereon. To maintain the integrity of the data processing system, processing of this command must be completed prior to responding to a snooped command. In the interest of promoting coherency, however, when a match exists between the real address of a snooped command and a command stored by the command buffer 600, hereinafter "the matching command," the bus coherency snoop logic 700 notifies the command buffer 600 of the match. In response, the command buffer 600 raises the priority of the matching command so that processing of the matching command will be completed as quickly as possible. Specifically, the command buffer 600 checks the route to bits for the matching command to determine which of the L1 routing logic 200, the L2 routing logic 400 and the system bus routing logic 800 is or will be routing the matching command. The command buffer 600 then outputs the raise priority signal discussed above to the queue priority logic of the appropriate routing logic if the corresponding command taken bits are off. As discussed in detail above, in response to the raise priority signal, the queue priority logic raises the priority of the queue 220, 230 and 240 to which the matching command has been or will be sent.

As discussed above, both the L1 cache and L2 cache also include bus coherency snoop logic, and in response to snooping a command, may output a cache line destined for the system bus. If only one directory entry is available, however, the free buffer logic 500 must somehow decide whether to indicate to either the L1 command acceptor logic 100 or the L2 command acceptor logic 300 that a directory address is available. This decision is made through the use of the snoop-toggle signal. The snoop-toggle signal is maintained by the bus coherency snoop logic 700 in the off state.

When a command is snooped, the bus coherency snoop logic 700 maintains the toggle-snoop signal in the off state for one cycle after updating the MESI state and outputting a response to the snooped command on the snoop bus. This gives the L1 cache sufficient time to output a command and the associated cache line to the transition cache if the L1 cache is going to respond to a snooped command in this manner.

On the following clock cycle, the toggle-snoop signal is turned on only for the duration of that cycle so that if the L2 cache responds to a snooped command and only one unused directory entry exists, that command has a chance of being accepted.

Command Tracking

Next, the manner in which the command buffer 600 illustrated in FIG. 2 tracks the processing of commands will be discussed in detail. As discussed above, when a command is stored in the command buffer 600, the initial routing is set via the route to bits. The command is then routed to the proper command sink, and when the command sink takes the command, the command sink issues a command taken signal. Based on the command taken signal, the command buffer updates the command taken bits. When the command sink completes processing of the command, the command sink issues a done signal. Based on the done signal, the command buffer 600 updates the done bits, and based on the done signal and command type, the command buffer 600 updates the route to bits.

FIG. 8 illustrates a specific example of the command tracking performed by the command buffer 600. FIG. 8 illustrates the in use, route to, command taken, and done bits for a directory entry of the command buffer 600 during the processing of a fetch command stored therein which was issued by the L1 cache in response to an L1 cache miss. Specifically, steps 1)–7) illustrate these bits when an L2 cache hit results on the L1 cache miss. Steps 8)–17) illustrate processing a fetch command issued in response to an L1 cache miss which is followed by an L2 cache miss, and which finally results in the data returning from the system bus and being stored in both the L1 and L2 caches. Finally, steps 18)–20) illustrate the processing of a fetch command issued in response to an L1 cache miss, which is followed by an L2 cache miss, and which results in the data returning from the system bus and being stored only in the L1 cache because the L2 cache was unable to free up a tag or directory entry therefor.

The steps illustrated in FIG. 8 will now be discussed in detail. Step 1) illustrates an unused directory entry wherein the in use bit is set to 0. In step 2), the fetch command resulting from the L1 cache miss is stored in the unused directory entry of the command buffer 600. Accordingly, the in use bit is turned on. In response to an L1 cache miss, the data is first sought from the L2 cache. Therefore, the L2 Tag1 bit and the L2 Data1 bit are turned on in the route to bits. Because this command issued from the L1 cache, the L11 bits in the command taken bits and the done bits are turned on.

In step 3), the L2 cache indicates that the command pipeline, and thus a directory entry, in the L2 cache is available to handle the command, and the data pipeline of the L2 cache is also available. Accordingly, in response to the command taken signal output from the L2 cache indicating tag and data availability, the command buffer 600 sets the L2 Tag1 and L2 Data1 bits in the command taken bits.

In step 4), the L2 cache experiences a cache hit. The L2 cache generates a cache hit signal indicating that processing of the command, but not the data, has completed. Accordingly, the L2 Tag1 bit is turned on in the done bits. When the L1 cache outputs a fetch command, a response thereto in the form of a cache line is expected. The L1 cache thus maintains a copy of the output command. Therefore, when a cache hit in the L2 cache takes place or the command is routed to the system bus, the command is concurrently routed back to the L1 cache. The command buffer 600 recognizes this based on the command type. Consequently, when the cache hit signal is received from the L2 cache, the command buffer 600 turns on the L12 bit in both the route to bits and the command taken bits in step 4).

In step 5), the L2 cache has completed outputting the cache line to the L1 cache via the data buffer 20, and outputs a signal to the command buffer 600 indicating this fact. In response thereto, the command buffer 600 turns on the L2 Data1 bit in the done bits.

In step 6) the L1 cache completes the storage of the cache line, and the MESI state therefor is transferred from the command buffer 600 to the L1 cache. A signal indicative thereof is then output by the L1 cache. Based on this signal, the command buffer 600 turns on the L12 bit in the done bits, and clears the L12 bit in the route to bits.

The free buffer logic 500 recognizes that the route to bits are all turned off, and that the status of the command taken bits equals the status of the done bits. Consequently, the free buffer logic 500 in step 7) turns the in use bit off.

As mentioned above, steps 8)–12) illustrate the processing of an L1 cache miss which is followed by an L2 cache miss. As indicated in step 8), steps 1)–3) discussed above are repeated. In step 9), however, instead of receiving a cache hit signal from the L2 cache, the command buffer 600 receives a cache miss signal from the L2 cache. In response to the receipt of this signal, the command buffer 600 turns on the L2 Tag1 and L2 Data1 bits in the done bits. Furthermore, based on this signal and the command type, the command buffer 600 recognizes that the command is then to be routed to the system bus, and turns on the SB bit and turns off the L2 Tag1 and L2 Data1 bits in the route to bits.

In step 10), the system bus indicates that the command has been taken, and the command buffer turns on the SB bit and L12 bit in the command taken bits. The command buffer 600 also turns on the L12 bit in the route to bits.

In step 11), the system bus outputs a signal to the command buffer 600 indicating that the data requested is being output to the data buffer 20. In response thereto, the command buffer 600 turns on the SB bit in the done bits. Also, based on this signal and the command, the command buffer 600 recognizes that the command is to be routed to the L2 cache in addition to the L1 cache. Therefore, the command buffer 600 turns on the L2 Tag2 bit in the route to bits.

In step 12), the L1 cache completes storage of the data, and outputs a signal indicative thereof. In response to this signal, the command buffer 600 clears the L12 bit in the route to bits and turns on the L12 bit in the done bits. In step 13), the L2 cache outputs a signal indicating that the command has been taken. This causes the command buffer 600 to turn on the L2 Tag2 bit in the command taken bits.

In step 14) of FIG. 8, the L2 cache outputs a signal indicating that the command has been processed by the L2 cache and that the L2 cache is available to store the data associated therewith. In response to this signal, the command buffer 600 turns on the L2 Data2 bit in the route to bits, turns off the L2 Tag2 bit in the route to bits, and sets the L2 Tag2 bit in the done bits. In step 15), the L2 cache outputs a signal that the data is being stored, and the command buffer 600 turns on the L2 Data2 bit in the command taken bits accordingly. In step 16), the L2 cache outputs a signal indicating that the data has been stored. In response thereto, the command buffer 600 turns on the L2 Data2 bit in the done bits and turns off the L2 Data2 bit in the route to bits. At this point in time, the free buffer logic 500 recognizes that the route to bits are all off, and that the status of the command taken bits equals the status of the done bits. Therefore, in step 17), the free buffer logic 500 turns the in use bit off.

In the example discussed above with respect to steps 8)–17), it was assumed that the L1 cache stored the data returning from the system bus before storage by the L2 cache. It should be recognized, however, that the L2 cache could have stored that data first, or that storage could have taken place concurrently.

In the final example shown in steps 18)–20), the L1 cache miss is followed by an L2 cache miss, and subsequently, the data returning on the system bus is stored in the L1 cache, but the L2 cache is unavailable to store the data. Therefore, as shown in step 18), steps 1)–3) and 9)–13) are repeated. Then in step 19), the L2 cache outputs a signal indicating that the command cannot be accepted. As a result, the command buffer 600 turns on the L2 Tag2 bit in the done bits, and turns off the L2 Tag2 bit in the route to bits. At this time, the free buffer logic 500 recognizes that all of the route to bits are turned off, and that the status of the command taken bits equals the status of the done bits. Consequently, the free buffer logic 500 turns the in use bit off.

Debug and Error Detection

Using the in use, route to, command taken and done bits, a directory entry can be disabled and errors detected. During the set-up of a data processing system incorporating the multi-entry fully associative transition cache according to the present invention, the operator may want to set the performance characteristics of the data processing system such that the performance of the present invention needs to be scaled back. The operator can accomplish this by disabling one or more directory entries. Also, if an error is detected in the data array 22, an operator will want to disable the directory entry corresponding to the cache line of the data array 22 containing the error. In this manner, use of the defective cache line can be prevented.

When a directory entry is available, the in use, route to, command taken and done bits are all set to zero. For a directory entry in use, the in use bit is set, and at least one of the route to, command taken and done bits is also set. Consequently, during normal operation, the situation where the in use bit is set, but not one of the route to, command taken, and done bits is set, does not arise. To disable a directory entry, the operator sets the in use bit and turns the route to, command taken and done bits off. The free buffer logic 500 recognizes this disable condition, and will not generate as an available directory address the directory address corresponding to a disabled directory entry.

Besides the disable condition discussed above, other combinations of the in use, route to, command taken and done bits should not occur during normal operation. The free buffer logic 500 recognizes these combinations as errors, and issues an error signal, not shown, to notify the operator to perform a debugging operation. The error conditions recognized by the free buffer logic 500 include: (1) neither the bit in the route to bits nor the bit in the done bits corresponding to a bit set in the command taken bits is set; (2) a route to bit and corresponding done bit are both set; and (3) the route to bits are all zero, but the command taken bits do not equal the corresponding done bits.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

We claim:

1. An apparatus for tracking commands between any of a plurality of command sources and any of a plurality of command sinks, comprising:

a command directory in a multi-entry fully associative transition cache connected to each of said plurality of command sources and each of said plurality of command sinks, said plurality of command sources and said plurality of command sinks comprising a hierarchy of caches and memory, said command directory receiving a command from any of said plurality of command sources, receiving signals from any of said plurality of command sinks, generating status information corresponding to said command based on said command and said received signals, and storing said status information, said status information indicating to which command sink said command is to be routed, whether said command sink has accepted said command, and whether said command sink has completed processing said command.

2. The apparatus of claim 1, wherein said status information includes a to-bit, taken-bit, and done-bit corresponding to each command sink, said to-bit indicates that a command is to be routed to a corresponding command sink when turned on, said taken-bit indicates that said corresponding command sink has accepted said command for processing, and said done-bit indicates that said corresponding command sink has completed processing said command.

3. The apparatus of claim 2, wherein said command directory turns said to-bit, said taken-bit, and said done-bit for each command sink on and off based on said received signals.

4. The apparatus of claim 2, wherein said command directory comprises:

a command buffer having a plurality of directory entries and storing said command and associated status information in one of said directory entries, said status information further including an in-use bit indicating whether a directory entry is in use storing a command and associated status information.

5. The apparatus of claim 2, wherein one of said plurality of command sources is a first cache interface; and one of said plurality of command sinks is a second cache interface.

6. The apparatus of claim 1, wherein said command directory generates said status information such that said command is tracked even when routed to multiple command sinks at the same time.

7. An apparatus for tracking commands between command sources and sinks, comprising:

a command directory receiving a command from at least one command source, receiving signals from command sinks, generating status information corresponding to said command based on said command and said received signals, said command directory comprising a command buffer and free buffer logic, said command buffer having a plurality of directory entries and storing said command and corresponding status information in one of said directory entries, said status information comprising a to-bit, a taken-bit, and a done-bit corresponding to each command sink, said to-bit indicates that a command is to be routed to a corresponding command sink when turned on, said taken-bit indicates that said corresponding command sink has accepted said command for processing, and said done-bit indicates that said corresponding command sink has completed processing said command, said status information also comprising an in-use bit indicating whether a directory entry is in use storing a command and associated status information;

said free buffer logic monitoring said in-use bits, said to-bits, said taken-bits, and said done-bits for each directory entry, determining which of said directory entries are disabled based on said monitoring, and instructing said command directory on which directory entries are unused and available for storing commands and associated status information based on said monitoring and determining.

8. The apparatus of claim 7, wherein said free buffer logic determines that a directory entry is disabled when said in-use bit is set and none of said to-bits, said taken-bits, and said done-bits are set.

9. An apparatus for tracking commands between command sources and sinks, comprising:

a command directory receiving a command from at least one command source, receiving signals from command sinks, generating status information corresponding to said command based on said command and said received signals, and storing said status information, said command directory comprising:

a command buffer having a plurality of directory entries and storing said command and corresponding status information in one of said directory entries; and free buffer logic;

said status information comprising a to-bit, a taken-bit, and a done-bit corresponding to each command sink, said to-bit indicates that a command is to be routed to a corresponding command sink when turned on, said taken-bit indicates that said corresponding command sink has accepted said command for processing, and said done-bit indicates that said corresponding command sink has completed processing said command, said status information further including an in-use bit indicating whether a directory entry is in use storing a command and associated status information; and said free buffer logic monitoring said to-bits, said taken-bits, and said done-bits, instructing said command directory on which directory entries are unused and available for storing commands and associated status information based on said monitoring, and determining an error condition based on said monitoring.

10. The apparatus of claim 9, wherein said free buffer logic determines an error condition when, for a directory entry, neither a bit in said to-bits nor a bit in said done-bits corresponding to a bit set in said taken-bits is set.

11. The apparatus of claim 9, wherein said free buffer logic determines an error condition when, for a directory entry, a to-bit and corresponding done-bit are both set.

12. The apparatus of claim 9, wherein said free buffer logic determines an error when, for a directory entry, said to-bits are all zero and said taken-bits do not equal said done-bits, respectively.

13. A method for tracking commands between any of a plurality of command sources and any of a plurality of command sinks, comprising:

(a) receiving a command from any of said plurality of command sources, each of which are connected to a multi-entry fully associative transition cache;

(b) receiving signals from any of said plurality of command sinks, each of which are connected to said multi-entry fully associative transition cache, said plurality of command sources and said plurality of command sinks comprising a hierarchy of caches and memory;

(c) generating status information for said command based on said command and said received signals, said status information indicating to which of any of said plurality of command sinks said command is to be routed, whether said command sink has accepted said command, and whether said command sink has completed processing said command; and (d) storing said status information in a command buffer of said transition cache.

14. The method of claim 13, wherein said status information includes a to-bit, taken-bit, and done-bit corresponding to each of said plurality of command sinks, said to-bit indicates that a command is to be routed to a corresponding one of said plurality of command sinks when turned on, said taken-bit indicates that said corresponding one of said plurality of command sinks has accepted said command, and said done-bit indicates that said corresponding one of said plurality of command sinks has completed processing said command.

15. The method of claim 14, further comprising:

(e) turning said to-bits, said taken-bits, and said done-bits for each of said plurality of command sinks on and off based on said received signals.

16. The method of claim 14, wherein said step (d) stores said command and associated status information in one of a plurality of directory entries included in said command buffer, said status information further including an in-use bit indicating whether a directory entry is in use storing a command and associated status information.

17. The method of claim 13, wherein said step (c) generates said status information such that said command is tracked even when routed to multiple command sinks at the same time.

18. The method of claim 13, wherein said step (a) receives a command from a first cache interface; and said step (b) receives signals from a second cache interface.

19. A method for tracking commands between command sources and sinks, comprising:

(a) receiving a command from a command source;

(b) receiving signals from command sinks;

(c) generating status information for said command based on said command and said received signals, said status information comprising a to-bit, a taken-bit, and a done-bit corresponding to each command sink, said to-bit indicates that a command is to be routed to a corresponding command sink when turned on, said taken-bit indicates that said corresponding command sink has accepted said command for processing, and said done-bit indicates that said corresponding command sink has completed processing said command;

(d) storing said status information in said command buffer;

(e) turning said to-bits, said taken-bits, and said done-bits for each command sink on and off based on said received signals; and (f) determining that processing of a command is complete when said to-bit for each command sink is off, and a status of said taken-bit for each command sink matches a status of a corresponding done-bit.

20. A method for tracking commands between command sources and sinks, comprising:

(a) receiving a command from a command source;

(b) receiving signals from command sinks;

(c) generating status information for said command based on said command and said received signals, said status information comprising a to-bit, a taken-bit, and a done-bit corresponding to each command sink, said to-bit indicates that a command is to be routed to a corresponding command sink when turned on, said taken-bit indicates that said corresponding command sink has accepted said command for processing, and said done-bit indicates that said corresponding command sink has completed processing said command, said status information further including an in-use bit indicating whether a directory entry is in use storing a command and corresponding status information;

(d) storing said command and corresponding status information in one of a plurality of directory entries included in said command buffer, (e) monitoring said in-use bits, said to-bits, said taken-bits, and said done-bits for each directory entry;

(f) determining which of said directory entries are disabled based on said monitoring in said step (e); and (g) instructing said step (d) on which directory entries are unused and available for storing commands and associated status information based on said monitoring and determining in said steps (e) and (f).

21. The method of claim 20, wherein said step (f) determines that a directory entry is disabled when said in-use bit is set and none of said to-bits, said taken-bits, and said done-bits are set.

22. A method for tracking commands between command sources and sinks, comprising:

(a) receiving a command from a command source;

(b) receiving signals from command sinks;

(c) generating status information for said command based on said command and said received signals, said status information comprising a to-bit, a taken-bit, and a done-bit corresponding to each command sink, said to-bit indicates that a command is to be routed to a corresponding command sink when turned on, said taken-bit indicates that said corresponding command sink has accepted said command for processing, and said done-bit indicates that said corresponding command sink has completed processing said command, said status information further including an in-use bit indicating whether a directory entry is in use storing a command and corresponding status information;

(d) storing said command and corresponding status information in one of a plurality of directory entries included in said command buffer;

(e) monitoring said to-bits, said taken-bits, and said done-bits;

(f) instructing said step (d) on which directory entries are unused and available for storing commands and associated status information based on said monitoring in said step (e); and (g) determining an error condition based on said monitoring in said step (e).

23. The method of claim 22, wherein said step (g) determines an error condition when, for a directory entry, neither a bit in said to-bits nor a bit in said done-bits corresponding to a bit set in said taken-bits is set.

24. The method of claim 22, wherein said step (g) determines an error condition when, for a directory entry, a to-bit and corresponding done-bit are both set.

25. The method of claim 22, wherein said step (g) determines an error when, for a directory entry, said to-bits are all zero and said taken-bits do not equal said done-bits, respectively.

* * * * *